(12) United States Patent
Nucci et al.

(10) Patent No.: US 8,019,764 B1
(45) Date of Patent: Sep. 13, 2011

(54) SYSTEM AND METHOD FOR INTERNET ENDPOINT PROFILING

(75) Inventors: Antonio Nucci, San Jose, CA (US); Supranamaya Ranjan, Houston, TX (US); Aleksandar Kuzmanovic, Evanston, IL (US)

(73) Assignee: Narus Inc., Sunnyvale, CA (US)

( * ) Notice: Subject to any disclaimer, the term of this patent is extended or adjusted under 35 U.S.C. 154(b) by 772 days.

(21) Appl. No.: 12/104,723

(22) Filed: Apr. 17, 2008

(51) Int. Cl.
G06F 17/00 (2006.01)
(52) U.S. Cl. ........ 707/739; 707/741; 707/748; 707/752; 707/755
(58) Field of Classification Search .................. 707/739, 707/741, 748, 752, 755
See application file for complete search history.

(56) References Cited

U.S. PATENT DOCUMENTS

| 7,801,896 B2 * | 9/2010 | Szabo ........................... 707/739 |
| 2007/0061266 A1 * | 3/2007 | Moore et al. .................... 705/51 |
| 2008/0177994 A1 * | 7/2008 | Mayer .............................. 713/2 |

OTHER PUBLICATIONS

Louis Plissonneau, Jean-Laurent Costeux, & Patrick Brown, "Analysis of Peer-to-Peer Traffic on ADSL" Pam2005, LNCS 3431, pp. 69-82, 2005.
"Unconstrained Endpoint Profiling (Googling the Internet)" Sigcomm 2008 Submission #103, 14 Pages.
Anthony McGregor, et al., Flow Clustering Using Machine Learning Techniques. In Passive and Active Measurement Conference, Apr. 19-20, 2004 Antibes Juan-les-Pins, France.
Andrew Moore and Konstantina Papagiannaki, Toward the Accurate Identification of Network Applications. In Passive and Active Measurement Conference 200, Mar. 2005, Boston, MA.
Peter Cheeseman and John Stutz. Bayesian Classfication (AutoClass): Theory and Results. In Advances in knowledge discovery and data mining, pp. 153-180, 1996.
Laurent Bernaille, et al., Early Application Identification. In CONEXT '06, 2nd Conference on Future Networking Technologies, Dec. 4-7, 2006, Lisboa, Portugal.
Google 101: How Google Crawls, Indexes and Serves the Web. Webpage on google website, retrieved on Apr. 16, 2008, 10:12AM.
Alan Mislove, et al. Measurement and Analysis of Online Social Networks. In ACM IMC '07, Association for Computer Machiner Internet Measurement Conference Oct. 24-26, 2007, in San Diego, CA, USA.
Jeffrey Erman, et al.,Traffic Classiffication using Clustering Algorithms. In ACM SIGCOMM 2006 Workshop on Mining Network Data (MineNet-06), Sep. 11-15, 2006,Pisa, Italy.
M. Patrick Collins, et al., Using Uncleanliness to Predict Future Botnet Addresses. In IMC '07 , Association for Computer Machiner Internet Measurement Conference, Oct. 24-26, 2007, in San Diego, CA, USA.
Matthew Roughan, et al., Class-of-Service Mapping for QoS: A Statistical Signature-Based Approach to IP Trafic Classification. In ACM IMC '04, Association for Computer Machiner Internet Measurement Conference, Oct. 25-27, 2004, in Taormina Italy.
Harsha Madhyastha, et al., iPlane: An Information Plane for Distributed Services. In OSDI '06, 7th USENIX Symposium on Operrating Systems Design and Implementation, Nov. 6-8, 2006, Seattle, Washington.

(Continued)

Primary Examiner — Sana Al-Hashemi
(74) Attorney, Agent, or Firm — Fernandez & Associates, LLP

(57) ABSTRACT

The present invention relates to a method of profiling an Internet endpoint associated with an Internet Protocol (IP) address, the method includes generating a profiling rule using an Internet search engine, obtaining a search result by inputting the IP address to the Internet search engine, and classifying the Internet endpoint based on the search result using the profiling rule.

11 Claims, 18 Drawing Sheets

OTHER PUBLICATIONS

Patrick Haffner, et al., ACAS: Automated Construction of Application Signatures. In ACM SIGCOMM MineNet '05. Workshop on Mining Network Data (MineNet-05), Aug. 22-26, 2005, Philadelphia, Pennsylvania, USA.

Thomas Karagiannis, et al., Profling tihe End Host. In PAM '07, Passive and Active Measurement Conference Apr. 5-6, 2007, Louvain-la-neuve, Belgium.

Subhabrata Sen, et al., Accurate, Scalable In-Network Identification of P2P Trafic Using Application Signatures. In WWW '04 Conference, May 17-22, 2004, New York City, NY.

Patrick Verkaik, Primed: Community-of-Interest-Based DDoS Mitigation. In SIGCOMM LSAD '06., Workshop on Large Scale Attack Defense (LSAD), Sep. 11-15, 2006, Pisa, Italy.

Yinglian Xie, et al., How Dynamic are IP Addresses? In ACM SIGCOMM '07, Data Communication Festival, Aug. 27-31, 2007, Kyoto, Japan.

Jian Liang, Pollution in P2P File Sharing Systems. In IEEE INFOCOM '05, The 24th Annual Conference Sponsored by IEEE Communications Society, Miami, Mar. 13-17, 2005.

Thomas Karagiannis, et al., BLINC: Multilevel Traffic Classiffication in the Dark. In ACM SIGCOMM '05, Aug. 22-26, 2005, Philadelphia, Pennsylvania, USA.

Thomas Karagiannis, et al., Is P2P Dying or just Hiding? In IEEE GLOBECOMM '04, Emerging Technologies, Applications, and Services, Nov. 27-Dec. 3, 2004, Dallas, Texas.

Janning Mai, et al, Is Sampled Data Sufficient for Anomaly Detection? In ACM IMC '06. Internet Measurement Conference 2006, Oct. 25-27, 2006, Rio de Janeiro, Brazil.

Patrick McDaniel, et al., Enterprise Security: A Community of Interest Based Approach. In NDSS '06, Annual Symposium on Network and Distributed System Security, Feb. 1-3, 2006, San Diego, CA.

Andrew Moore and Denis Zuev, Internet Traffic Classification Using Bayesian Analysis. In ACM SIGMETRICS '05, Proceedings of the 2005 ACM SIGMETRICS international conference on Measurement and modeling of computer systems, Jun. 6-10, 2005, Banff, AB, Canada.

\* cited by examiner

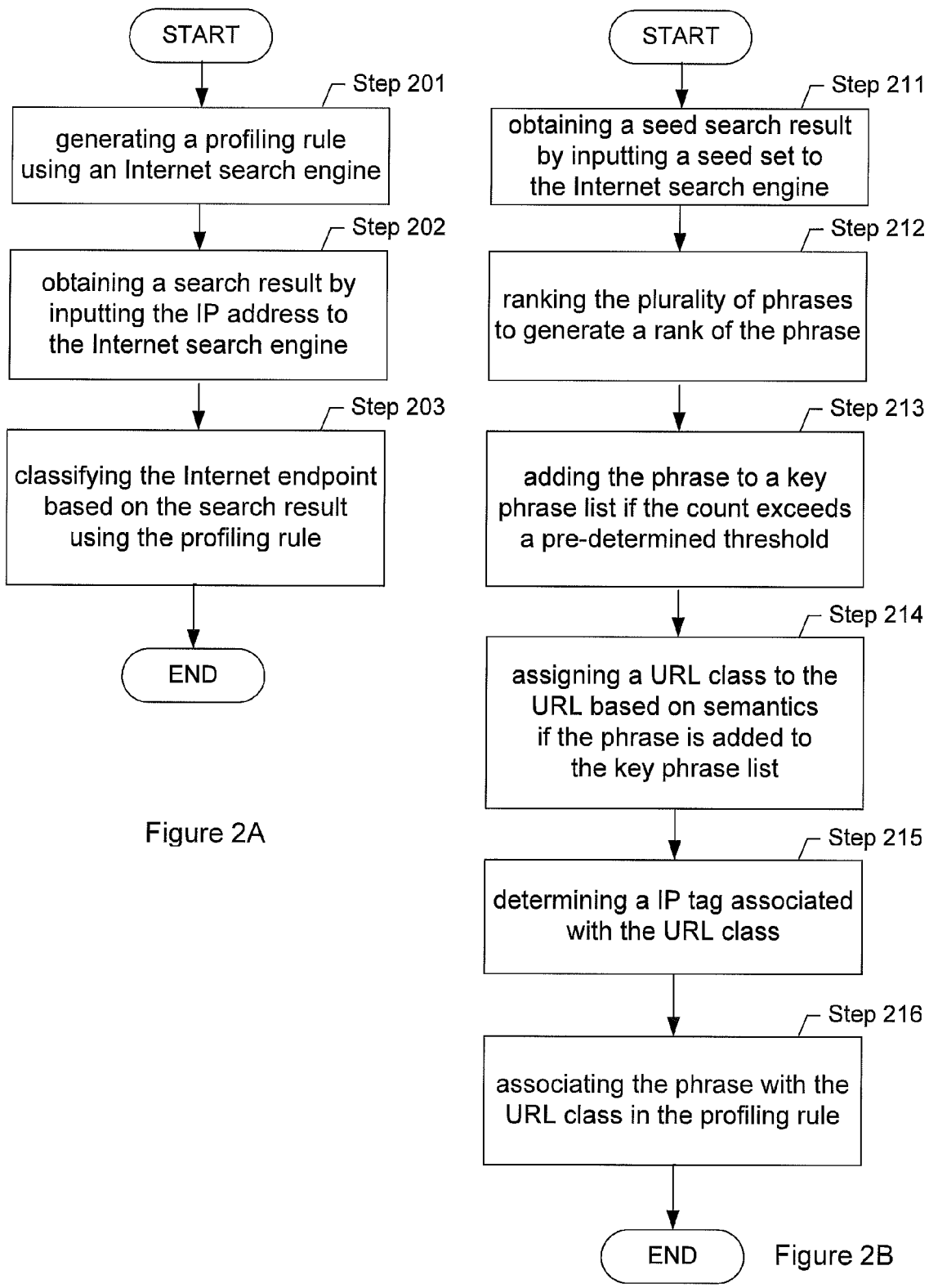

achei varias urls | Percautus Radio- [ Translate this page ]
mms://198.65.144.237/noisefm noise net. http://suaradio.dnip.net:8038 radio hype.
http://idc.radiowebtv.com:8365 rondonia total ...
percautus.com.br/radio/node/82 - 10k - Cached - Similar pages - Note this Lists- [ Translate this page ]
http://www.gospelradioweb.com.br/. » Gospel Unit. http://www.gospelunit.com.br/. Web Black
Rádio. » Livre FM. mms://198.65.144.237/elshaday32. » New Canaan ...
welitagomes.spaces.live.com/Lists/cns!2B38B4FDF03BE567!340/ - 57k -
Cached - Similar pages - Note this Comunidade YouTube - Google - Videos - Orkut - Os Melhres Vídeos- [ Translate this page ]
ATALAIA NET : mms://198.65.144.237/Web TV AtalaiaNET CANÇÃO NOVA :
mms://70.84.100.18/tv128k R.I.T : http://70.86.179.146:81/tv?MSWMExt=.asf ...
www.bairroflamengo.com.br/youtube/videosfamosos002.html - 48k -
Cached - Similar pages - Note this

Figure 3A

Remove Hacker Tool.CrackSearch
Summary, url it browses: n/asmtp transaction: n/airc transaction: n/ahidden entries:
n/aconnects to servers: 69.66.187.2 , 65.54.183.202 , 207.46.111.48 ...
spywaredetector.net/spyware_encyclopedia/Hacker%20Tool.CrackSearch.htm - 33k -
Cached - Similar pages - Note this Remove Backdoor.Amitis
    the following internet connection was established: 69.66.187.2:45(wlbg-03-0770.
    dsl.iowatelecom.net) 69.66.187.2:28(wlbg-03-0770.dsl.iowatelecom.net) ...
    www.spywaredetector.net/spyware_encyclopedia/Backdoor.Amitis.htm - 33k -
    Cached - Similar pages - Note this
    More results from www.spywaredetector.net »

AWSTATS DATA FILE 6.4 (build 1.814) # If you remove this file, all ...
AWSTATS DATA FILE 6.4 (build 1.814) # If you remove this file, all statistics for date 2006-
09 will be lost/reset. # Position (offset in bytes) in this file ...
donmega.com/AWStats/awstats092006.donmega.com.txt - 250k -
Cached - Similar pages - Note this

Figure 3B

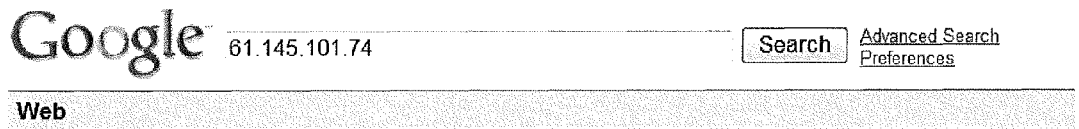

Maquina: antispam.unizar.es Sistema: Criba 1.0 Fecha inicio: Apr ...- [ Translate this page ]
... 449 52 [65.182.128.54] 360 47 [61.145.101.74] 354 354 [200.216.25.66] 270 99
[200.158.186.15] 238 63 [200.59.52.29] 231 104 [216.39.87.17] 220 0 ...
webmail.unizar.es/spam/stats/2004/200404/resumen.2004.04.26 - 796k -
Cached - Similar pages - Note this

Figure 3C

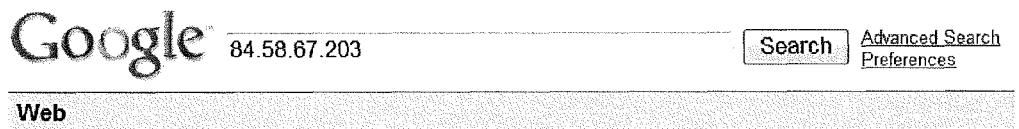

83.10.253.58 89.178.131.226 190.166.4.164 84.58.67.203 201.250 ...
83.10.253.58 89.178.131.226 190.166.4.164 84.58.67.203 201.250.28.29 190.21.185.222
81.172.57.174 190.56.196.15 190.42.45.31 216.79.55.118 201.13.166.226 ...
www.unsubscore.com/blacklist.xml - 977k - Cached - Similar pages - Note this

Figure 3D

AdServerStatus - Ad server status of over 400 internet advertising ...
PING ads.joetec.net (207.44.248.65) from 207.235.5.120 : 56(84) bytes of data. 64 bytes
from ads.joetec.net (207.44.248.65): icmp_seq=0 ttl=53 time=17.339 ...
www.adserverstatus.com/serverlist.php?action=status&
company3=JoeTec&server2=ads.joetec.net - 13k - Cached - Similar pages - Note this first time hijackthis log - Geeks to Go!
O1 - Hosts: 207.44.248.65 www.ads.joetec.net O1 - Hosts: 67.159.3.150
www.torrentportal.com O1 - Hosts: 69.57.140.27 www9.paypopup.com ...
www.geekstogo.com/forum/first-time-hijackthis-log-t63677.html - 56k -
Cached - Similar pages - Note this

Figure 3E

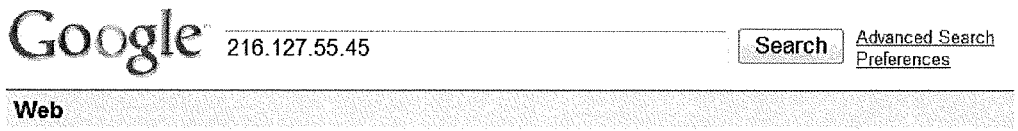 216.127.55.45          Search   Advanced Search / Preferences

Web

CoolWhois.com - WHOIS search of sleazydream.com
IP Addresses: 207.246.152.23 (test-rme-temp1), 216.127.55.45 (test-for-block) Whois results from whois.dotster.com: The information in this whois database ...
www.coolwhois.com/d/sleazydream.com - 8k - Cached - Similar pages - Note this "No.","URL","Rating","IP Address","Update Date" 17793,"satradio9 ...
... 13949,"www.sleazyeaze.com",6,"212.227.34.3",31/01/07 13948,"www.sleazydream.
com",6,"216.127.55.45",31/01/07 13947,"www.sky-dream.com",6,"124.33.71.220" ...
facthai.files.wordpress.com/2007/06/mict-blocklist-28-05-07csv.txt - 601k -
Cached - Similar pages - Note this

Figure 3F

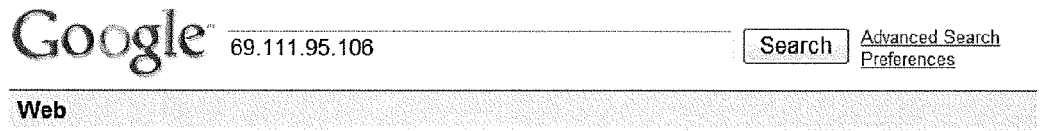 69.111.95.106          Search   Advanced Search / Preferences

Web

DNS Server List - Name Server List
69.111.95.106 206.196.151.153 69.111.95.107. Shaw Cable 64.59.144.16 64.59.144.17 ...
69.111.95.106 206.196.151.153. Tiscali Replacemet for Browser errors ...
www.dnsserverlist.org/ - 25k - Cached - Similar pages - Note this DNS Server List - Public DNS Server List Name Server List - Public ...
69.111.95.106 206.196.151.153. Earthlink - seem to be shared by Cable and DSL ...
69.111.95.106 206.196.151.153. ORSC Public Access DNS Nameservers (Anyone ...
www.walltechnet.com/dnsserverlist_site/dnsserverlist.htm - 21k -
Cached - Similar pages - Note this 209.40.202.107 Web Search - Who.is
DNS Server List 69.111.95.106 206.196.151.153 69.111.95.107...202.75.44.18
203.106.3.171 202.75.44.20 69.111.95.106 206.196.151.153 69.111.95.107. ...
www.whois.ws/websearch.php?current_name=209.40.202.107 - 21k -
Cached - Similar pages - Note this 216.55.97.168 Web Search - Who.is
   NTL (Cable) and Virgin.net (ADSL) 194.168.4.100 194.168.8.100 69.111.95.106
   206.196.151.153...199.166.28.10 199.166.29.3 199.166.31.3 195.117.6.25 ...
   www.whois.ws/websearch.php?current_name=216.55.97.168 - 23k -
   Cached - Similar pages - Note this
   More results from www.whois.ws »

Forum @ Linux.Or.Id • View topic - Squid Performance
203.130.196.155 3874 2573 203.130.196.5 1298 1004 208.67.222.222 298 50
203.130.208.18 248 244 208.67.220.220 4 3 202.134.1.10 1 0 69.111.95.106 1 0 ...
forum.linux.or.id/viewtopic.php?f=16&p=85193 - 74k - Cached - Similar pages - Note this msn problem + error signature - Tech Support Guy Forums
{53E96D8F-F817-45B3-9898-FFFE290AEAA1}: NameServer = 69.111.95.106
206.196.151.153 O23 - Service: Google Updater Service (gusvc) - Google - C:\Program ...
forums.techguy.org/windows-nt-2000-xp/666244-msn-problem-error-signature.html - 42k -
Cached - Similar pages - Note this

Figure 3G

Google 201.229.208.2            [Search]  Advanced Search
                                          Preferences

Web

User talk:201.229.208.2 - OrbiterWiki
User talk:201.229.208.2. Category: temp-ban ... Retrieved from
"http://www.orbiterwiki.org/wiki/User_talk:201.229.208.2". Category: temp-ban ...
www.orbiterwiki.org/wiki/User_talk:201.229.208.2 - 10k - Cached - Similar pages - Note this User talk:201.229.208.2 - Wikipedia, the free encyclopedia
This IP address, 201.229.208.2, is registered to Compaa Dominicana de Telfonos,
Dominican Republic, and may be shared by multiple users. ...
en.wikipedia.org/wiki/User_talk:201.229.208.2 - 32k - Cached - Similar pages - Note this MonkeyWiki: Blocked Spam
201.229.208.2 Sat Feb 2 20:34:06 2008 linksleeve <a href= h... 193.95.84.205 Sat Feb 2 ...
201.229.208.2 Sun Feb 3 17:13:26 2008 linksleeve <a href= h. ...
www.waywood.co.uk/MonkeyWiki/BlockedSpam.html - 86k -
Cached - Similar pages - Note this o\" Diary..jeab \"o ...Jeab~ jc ~ c - gam รักกัล
<a href= ></a>. 12:18 - 01/03/2551 ip : 201.229.208.2. name : Spaiva-hl age : Unknown
mail ... <a href= ></a>. 11:35 - 01/03/2551 ip : 201.229.208.2 ...
jc23.diary.postjung.com/ - 44k - Cached - Similar pages - Note this FREE PROXY LIST - Protect Your Online Privacy!
WHOIS Lookup result of 201.229.208.2. % Joint Whois - whois.lacnic.net % This server
accepts single ASN, IPv4 or IPv6 queries % Copyright LACNIC lacnic.net ...
goodbyefirewall.cn/index.php?act=whois&ip=201.229.208.2 - 7k -
Cached - Similar pages - Note this ProxyHut - Free Proxy List - New Proxies - Freshest Proxies on the Web
02-29-2008 10:03:06, 0.37 Seconds, 201.229.208.2, 80, Dominican Republic, 02-18-2008
20:43:42. 02-29-2008 10:03:10, 0.61 Seconds, 195.229.236.106 ...
www.proxyhut.org/index.php?sort=verified - 54k - Cached - Similar pages - Note this

Figure 3H

Google 195.242.214.33            [Search]  Advanced Search
                                          Preferences

Web

284586,195.242.214.33,1,0 214730,61.230.110.159,1,0 135164,194.31 ...
284586,195.242.214.33,1,0 214730,61.230.110.159,1,0 135164,194.31.205.2,1,0
317296,195.3.78.174,1,0 70233,69.20.9.103,1,0 332800,210.236.176.5,1,0 196002 ...
www.netdimes.org/PublicData/Routers1_2007.csv - Similar pages - Note this

Figure 3 I

Google 65.54.246.88    [Search]  Advanced Search
                                 Preferences Web TrustedSource - Query Result for 65.54.246.88
Information for '65.54.246.88'. Please enable JavaScript! Secure Computing Corporate
Homepage | Contact | Privacy Policy | Disclaimer ...
www.trustedsource.org/TS?do=feedback&subdo=query&q=65.54.246.88 - 21k -
Cached - Similar pages - Note this

65.54.246.88 | Mail Server | IP Address Inspector | Project Honey Pot
The Project Honey Pot system has detected behavior from the IP address 65.54.246.88 that
is consistent with that of a Mail Server.
www.projecthoneypot.org/i_c7420cedc9db99d0ebe913f5c88db04e - Similar pages - Note this Nabble - assp-test - Analyser says 0 Probability for Bayesian Spam
65.52.0.0/14 contains 65.54.246.88 - client-ip=65.54.246.88; ... Dec-23-07 04:44:59 id-
3098c15340 [MessageOK] 65.54.246.88 <fmuspty27138mt@...> to: ...
www.nabble.com/Analyser-says-0-Probability-for-Bayesian-Spam-td14437968.html - 125k -
Cached - Similar pages - Note this RootsWeb: Listowners-L [LO] Multiple List mail and posts not ...
[65.54.246.88]) by mail.rootsweb.com (8.13.8/8.13.1) with ESMTP id l9O9rnXn022306 for
<>; Wed, 24 Oct 2007 03:54:09 -0600 ...
archiver.rootsweb.com/th/read/Listowners/2007-10/1193249350 - 18k -
Cached - Similar pages - Note this Fwd: CONGRATULATION YOU WIN!! | SCAMDEX
... Fri, 18 Aug 2006 04:20:49 -0700 X-Originating-IP: [65.54.246.88] Authentication-Results:
mta113.mail.re4.yahoo.com from=hotmail.com; domainkeys=neutral ...
scamdex.com/NSX/L/NSX20Aug20062200320700.html - 51k -
Cached - Similar pages - Note this

Figure 3 J

Google 217.233.206.23    [Search]  Advanced Search
                                   Preferences Web                                                              Results 1 - 1 of 1 for 217.233.206.23. ( Most Recent Dictionary Attackers | Project Honey Pot
Dictionary Attacker IP, Sent, First Seen - Last Seen - 89.24.86.227, 3, 2008-03-01, 2008-03-
01. 217.233.206.23, 19, 2008-03-01, 2008-03-01 ...
www.projecthoneypot.org/top_dictionary_attackers.php - 34k -
Cached - Similar pages - Note this

*In order to show you the most relevant results, we have omitted some entries very similar to the 1 already displayed.
If you like, you can repeat the search with the omitted results included.*

Figure 3K

Google  200.199.201.101                    [Search]  Advanced Search
                                                     Preferences

Web                                                                              Re

BroadbandGaming
HL2S, ArenaTurbo CS:Source #07 Classic Tick 66, hl2_cstrike, de_cbble, 200.199.201.101.
HL2S, ArenaTurbo CS:Source #08 Classic Tick 66, hl2_cstrike ...
gaming.broadbandreports.com/about/game_master.php?page=20 - 197k -
Cached - Similar pages - Note this

Servidores de Counter-Strike Source original - Counter-Strike Br- [ Translate this page ]
200.199.201.101:27017 Brturbo CS:Source 06 4Fun Novos Mapas 01 - Experimentais
200.199.201.102:27015 Brturbo CS:Source 07 4Fun Novos Mapas 02 - Escolhidos ...
forum.counter-strikebr.com.br/index.php?showtopic=202&view=getlastpost - 104k -
Cached - Similar pages - Note this

Lista de IPs dos Servers ArenaTurbo - Atualizado 04/02 - FÓRUM ...- [ Translate this page ]
ArenaTurbo CS:Source #06 -EVOLUTION- - 200.199.201.101:27016 - 24 ArenaTurbo
CS:Source #07 Classic Tick 66 - 200.199.201.101:27015 - 16 ...
forum.arenaig.ig.com.br/vbulletin/showthread.php?t=10324 - 44k -
Cached - Similar pages - Note this > Cadê? @_@ - FÓRUM ArenaTurbo- [ Translate this page ]
> ArenaTurbo CS:Source #06 Massacre 03 - 200.199.201.101 - 24 ArenaTurbo CS:Source
> #07 Classic tick 66 01- 200.199.201.101 - 16 ...
> forum.arenaig.ig.com.br/vbulletin/showthread.php?t=29249 - 54k -
> Cached - Similar pages - Note this
> More results from forum.arenaig.ig.com.br »

Divulgaçao, CSS - Fórum Adrenaline- [ Translate this page ]
200.199.201.101:27015 - 16 Slots 200.199.201.114:27015 - 32 Slots Aproveitem ps. sorry se
nao poderia postar isso aqui, mas mandei mp pro moderador ...

Figure 3 L

Google  200.101.75.139                     [Search]  Advanced Search
                                                     Preferences

Web                                                          Results 1 - 2 of 2 for 200.101.75.

This file is Q2Admin compatible. See the Q2Admin documentation on ...
... 199.222.164.99 BAN: - IP 199.224.118.154 BAN: - IP 199.44.250.74 BAN: - IP
200.100.142.241 BAN: - IP 200.101.75.139 BAN: - IP 200.102.254.103 BAN: - IP ...
www.quakeabuse.org/q2admin/legacy/banlist_ALL_02_04_2007.txt - 770k -
Cached - Similar pages - Note this

PunksBusted Master Ban Lists
"83.26.10.121" Screenshot [PsB:5260 V008B09E8] 50f55a8fbbed204ac120d7450d55936a
"Bronks" "200.101.75.139" PB HACK #130035 [PsB:3315 V008B03AC] ...
www.punksbusted.com/cgi-bin/membership/publicbans.cgi/ET_pbbans.html?
key=4&remove=0&html=1 - Similar pages - Note this

*In order to show you the most relevant results, we have omitted some entries very similar to the 2 already displayed.*
*If you like, you can repeat the search with the omitted results included.*

Figure 3M

Google 220.164.140.199    [Search] Advanced Search / Preferences

Web    Personalized Results 1 - 10

Tip: Search for English results only. You can specify your search language in Preferences Official eMule-Board > Edonkey Servers (64.34.160.0/19)
07.10.2005 11:53:00: Connected to 220.164.140.199 (220.164.140.199:4661), sending
login ... 07.10.2005 11:53:02: Connection established on: 220.164.140.199 ...
forum.emule-project.net/lofiversion/index.php/t89824.html - 12k -
Cached - Similar pages - Note this 迈克尔杰克逊------永远的世界流行之王(页1) - 精彩贴图- 安福论坛 ...- [ Translate this page ]
[img]http://220.164.140.199/images/48319-20051110062036-1.jpg[/img]. 墓碑下的吻 2006-
6-15 14:26. [img]http://www.volny.cz/butterflie/wallpapers/45b.jpg[/img] ...
bbs.linli.gov.cn/archiver/?tid-4410.html - 6k - Cached - Similar pages - Note this 迈克尔杰克逊------永远的世界流行之王(页2) - 精彩贴图- 安福论坛 ...- [ Translate this page ]
    [img]http://tinypic.com/b6sp3t.jpg[/img]. 墓碑下的吻 2006-6-15 14:30. [img]
    http://220.164.140.199/images/59724-20060114090820-18.jpg[/img] ...
    bbs.linli.gov.cn/archiver/?tid-4410-page-2.html - 6k - Cached - Similar pages - Note this 有好的电驴服务器吗？ _百度知道- [ Translate this page ]
ed2k://|server|220.164.140.199|4661|/ ed2k://|server|219.238.233.110|1008|/
ed2k://|server|222.186.8.70|4089|/ ed2k://|server|207.176.22.20|4661|/ ...
zhidao.baidu.com/question/959692.html - 28k - Cached - Similar pages - Note this Mytob-BF の mass mailing を TruPrevent が prevent している log ...- [ Translate this page ]
いくつかのホスト (220.164.140.199 など) に接続しようとする。 そこで 192.168.0.2 に標的を置
いてみる。administrator パスワードを administrator に変更。 ...
www.st.ryukoku.ac.jp/~kjm/security/20050828-matcha139/TruPrevent.txt - 9k -
Cached - Similar pages - Note this

Figure 3N

Google  158.38.8.251                               [ Search ]  Advanced Search
                                                              Preferences

Web underworld1.no.quakenet.org - IRC Server - irc.netsplit.de
IP Address: 158.38.8.251. Last connected: 2008-03-05 05:08 (UTC). Server Options: WHOX
WALLCHOPS WALLVOICES USERIP CPRIVMSG CNOTICE SILENCE=15 MODES=6 ...
irc.netsplit.de/servers/details.php?host=underworld1.no.quakenet.org - 21k -
Cached - Similar pages - Note this

$Id: bleeding-drop.rules $ # Emerging Threats Botnet Command and ...
... 143.248.133.157,145.89.150.59,147.127.160.120,149.9.1.16,150.254.6.206,151.189.
0.165,154.35.200.44,155.230.18.48,158.38.8.251,161.53.178.240,163.20.39.5 ...
www.emergingthreats.net/rules/bleeding-botcc.rules - 22k -
Cached - Similar pages - Note this > $Id: bleeding-fwip.rules $ # Emerging Threats fwip rules. # # Raw ...
> ... 143.248.133.157 145.89.150.59 147.127.160.120 149.9.1.16 150.254.6.206
> 151.189.0.165 154.35.200.44 155.230.18.48 158.38.8.251 161.53.178.240 163.20.39.5 ...
> www.emergingthreats.net/fwrules/bleeding-edge-Block-IPs.txt - 25k -
> Cached - Similar pages - Note this
> More results from www.emergingthreats.net » watchlist.security.org.my, contact mel@hackinthebox.org # ip/net ...
... botcc, 2008/02/19 00:03:06 158.38.8.251, www.emergingthreats.net/rules/bleeding-
botcc.rules, ET DROP Known Bot C&C Server Traffic (group 1) , botcc, ...
watchlist.security.org.my/botcc.txt - 136k - Cached - Similar pages - Note this

QuakeNet Forums: QuakeNet/IRC User Support => Cant Connect to quakenet
Connect retry #1 158.38.8.251 (8080) keep in mind quakenet is the only irc server he has
this problem with. [Updated on: Wed, 19 July 2006 00:59] ...
forums.quakenet.org/index.php?t=msg&goto=1856& - 36k -
Cached - Similar pages - Note this

Figure 3O

Google 58.61.33.40 [Search] Advanced Search / Preferences

Web Result

Tip: Search for English results only. You can specify your search language in Preferences 封堵QQ-- 服务器地址及端口列表- Net130.com- [ Translate this page ]
58.61.33.40 Block QQ Server IP 61.144.238.149 Block QQ Server IP 58.60.9.58 Block QQ
Server IP 61.172.240.43 Block QQ Server IP. 把以上列表中的地址和端口做 ...
www.net130.com/CMS/Pub/network/network_security/2007_05_20_68404.htm - 9k -
Cached - Similar pages - Note this 【转】常用软件、游戏IP / 端口资料方便大家查询管理欢迎更新信息 ...- [ Translate this page ]
58.61.33.40 58.61.39.213 219.133.38.9 219.133.60.175 QQ的端口有:tcp:4000+N个QQ登
陆，如果登陆3个QQ，那么它的端口就是4003，但如果内网太多QQ登陆的话，它的端口 ...
bbs.router.net.cn/simple/index.php?t20806.html - 38k - Cached - Similar pages - Note this

[原创]QQ常用端口及服务器IP地址- mOnOwall 应用- mOnOwall中国论坛 ...- [ Translate this page ]
58.61.33.40 Block QQ Server IP 61.144.238.149 Block QQ Server IP 58.60.9.58 Block QQ
Server IP 61.172.240.43 Block QQ Server IP 在mOnO里面把这些IP全部封掉。 ...
www.mOnOchina.org/viewthread.php?tid=5644 - 29k - Cached - Similar pages - Note this CollegeSwimming.com::Meet Results::Louisville Sweeps Miami-OH
collegeswimming.com banner. Louisville Sweeps Miami-OH. What's faster than these? A
continually-updated top times list. Help keep it current by updating ...
www.collegeswimming.com/meet/4555/ - 63k - Cached - Similar pages - Note this 异常IP地址发送的数据- [ Translate this page ]
2008-01-10 15时, 闵愁泸涓□□, 10.148.24.49, 58.61.33.40, TCP, 80, 110, -. 2008-01-10 15
时, 闵愁泸涓□□, 10.148.24.49, 222.73.219.12, TCP, 80, 106, - ...
info.edu.sh.cn/topip/qp/detail.php?i=47&ip=10.148.24.49&qx=董固中学
&date=20080110&hh=... - 26k - Cached - Similar pages - Note this

Figure 3P

Google 200.101.79.152 [Search] Advanced Search / Preferences

Web Results 1 - 1 of 1 for 200.1

AWSTATS DATA FILE 6.5 (build 1.857) # If you remove this file, all ...
... 32 250246 20060605181108 200.44.15.217 1 16 85621 20060616215613 148.240.8.162 0
1 28850 66.119.81.131 4 6 31569 20060612212035 200.101.79.152 1 2 5507 ...
biblioteca.catie.ac.cr/awstats/wwwroot/cgi-bin/awstats062006.orton.catie.ac.cr.txt - 749k -
Cached - Similar pages - Note this

*In order to show you the most relevant results, we have omitted some entries very similar to the 1 already displayed.
If you like, you can repeat the search with the omitted results included.*

Figure 3Q

Google 66.11.49.136

Web

Wikipedia:WikiProject Spam/LinkReports/i11.photobucket.com ...
... i11.photobucket.com resolves to 66.11.49.136 - 66.11.49.136: Linksearch en - meta - de - fr - simple - wikt:en - wikt:fr • Reports: Links on en - COIBot ...
en.wikipedia.org/wiki/Wikipedia:WikiProject_Spam/LinkReports/i11.photobucket.com - 35k -
Cached - Similar pages - Note this

CacheMgr@localhost: ipcache
... 2( 0) 66.11.48.100-OK 66.11.49.136-OK sortweb.chinatimes.com 62359 -62299 6( 0)
210.200.239.6-OK 210.200.236.34-OK 210.200.236.35-OK 210.200.236.32-OK ...
proxy.ncu.edu.tw/cgi-bin/cachemgr.cgi?host=localhost&
port=3128&user_name=&operation=ipcache... - 428k - Cached - Similar pages - Note this

CacheMgr@127.0.0.1: ipcache
    ... 66.11.48.100-OK 66.11.49.136-OK hoteldiy.network.com.tw 106033 -102862 1( 0)
    61.63.45.38-OK dukehotel.network.com.tw 106033 -102862 1( 0) 61.63.45.38-OK ...
    proxy.ncu.edu.tw/cgi-bin/cachemgr.cgi?host=127.
    0.0.1&port=3128&user_name=&operation=ipcache... - 634k -
    Cached - Similar pages - Note this

CacheMgr@localhost: ipcache
... 8527 -8096 2( 0) 66.11.49.136-OK 66.11.48.100-OK as.casalemedia.com 8533 ......
24756 -21158 2( 0) 66.11.48.100-OK 66.11.49.136-OK bass.ezpeer.com 24766 ...
proxyftp.tyrc.edu.tw/cgi-bin/cachemgr.cgi?host=localhost&
port=3128&user_name=&operation=ipcac... - 977k - Cached - Similar pages - Note this

[PDF] TippingPoint One Week Report
File Format: PDF/Adobe Acrobat
1/26/2007 13:50. 4625: HTTP: Photobucket.com Access. Block. 172.16.1.89. 66.11.49.136.
80. 1. 1/26/2007 13:49. 2965: Spyware: SaveNow/WhenU Program Download ...
www.newnet66.org/ID/Resources/TPEvents.pdf - Similar pages - Note this

Figure 3R

Google 200.143.1.34

Web /303 /302 /304

InForum Mensagem: N° da declarção do ano passado - 8:41pm - [ Translate this page ]
Data 30/03/2006 16:45:20 De: harabari IP 200.143.1.34 Assunto: N° da declarção do ano
passado. boa tarde, alguem seberia me dizer onde posso conseguir n° ...
inforum insite.com.br/imposto-de-renda-pessoa-fisica/2670126.html - 15k -
Cached - Similar pages - Note this

SYSTEM AND METHOD FOR INTERNET ENDPOINT PROFILING

BACKGROUND OF THE INVENTION

1. Field of the Invention

The present invention relates to computers and computer networks. More particularly, the invention relates to profiling an Internet endpoint associated with an Internet Protocol (IP) address.

2. Background of the Related Art

Profiling what users are doing on the Internet at a global scale, e.g., which applications and protocols users use, which sites the users access, and who the users try to talk to, are intriguing and important questions for a number of reasons. For example, the profiling results can reveal regional characteristics of cultural and behavioral patterns, important user usage pattern trends, potential exploitation of security vulnerabilities, early indication of user acceptance of a new product or service, etc. The profiling results can be used for various purposes such as strategic development, product/service marketing, network traffic engineering, security enhancement, etc.

The most common way to answer the above questions is to analyze network traces. However, the access issues to network traces at a global scale and the processing power required for analyzing network traces in large volume result in the inapplicability of state-of-art packet-level traffic classification tools for this scenario.

The Internet is composed of machines (e.g., computers or other devices with Internet access) associated with IP addresses for identifying and communicating with each other on the Internet. The Internet and the IP addresses are well known to those skilled in the art. These machines are called endpoints on the Internet. Internet endpoints may act as a server, a client, or a peer in the communication activity on the Internet. In vast majority of scenarios, information about servers such as the IP address are publicly available for user to access. In peer-to-peer (p2p) based communication, in which all endpoints can act both as clients or servers, the association between an end point and the p2p application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

In general, in one aspect, the present invention relates to a method of profiling an Internet endpoint associated with an Internet Protocol (IP) address, the method includes generating a profiling rule using an Internet search engine, obtaining a search result by inputting the IP address to the Internet search engine, and classifying the Internet endpoint based on the search result using the profiling rule.

In general, in one aspect, in the method, generating the profiling rule includes obtaining a seed search result by inputting a seed set to the Internet search engine, the seed set comprising a plurality of randomly chosen IP addresses, the seed search result comprising a plurality of hit texts and a Uniform Resource Locator (URL) associated with a hit text of the plurality of hit texts, the plurality of hit texts comprising a plurality of phrases, the hit text comprising a phrase of the plurality of phrases, ranking the plurality of phrases to generate a rank of the phrase based a count of the phrase in the plurality of hit texts, adding the phrase to a key phrase list if the count exceeds a pre-determined threshold, assigning a URL class to the URL if the phrase is added to the key phrase list, the URL class being determined from the phrase based on semantics, determining a IP tag associated with the URL class, the IP tag being determined from the URL class and the phrase based on semantics, and associating the phrase with the URL class in the profiling rule.

In general, in one aspect, in the method, classifying the Internet endpoint includes obtaining a search result by inputting the IP address to the Internet search engine, the search result comprising a Uniform Resource Locator (URL) having a domain name, and assigning the URL class to the URL and assigning the IP tag to the Internet end point if the domain name comprises the phrase.

In general, in one aspect, in the method, the profiling rule further comprises a data structure having an entry, the entry having a first domain name associated with the phrase, and classifying the Internet endpoint includes obtaining a search result by inputting the IP address to the Internet search engine, the search result comprising a Uniform Resource Locator (URL) having a second domain name, assigning the URL class to the URL and assigning the IP tag to the Internet end point if the first domain name is the same as the second domain name.

In general, in one aspect, in the method, the data structure is a hash table having a plurality of indexes corresponding to a plurality of values, the plurality of indexes comprising the first domain name, the plurality of values comprising the phrase, the search result further comprises a hit text associated with the URL, the hit text comprising a phrase in the key phrase list, and generating the profiling rule further includes adding an index comprising the second domain name to the cache if the plurality of indexes do not comprise the second domain name, setting a counter to an initial count, obtaining another search result by inputting another IP address to the Internet search engine, the another search result comprising another hit text associated with another URL; the another hit text comprising another phrase in the key phrase list, incrementing the counter if the another URL comprises the second domain name, and setting a value in the hash table corresponding to the index based on at least one selected from the group consisting of the phrase and the another phrase if the counter exceeds a pre-determined threshold.

In general, in one aspect, in the method, the hit text comprises content of a webpage referenced by the URL.

In general, in one aspect, the present invention relates to a method of profiling an Internet endpoint associated with an Internet Protocol (IP) address, the method includes collecting a snapshot of a plurality of web-pages in at least a portion of Internet, generating a reverse-index based on the snapshot, the reverse-index being a mapping of phrases to web-pages having the phrases therein, resolving a search query using the reverse-index to generate a search result, the search query comprising at least one selected from a group consisting of a search phrase and two or more search phrases combined via one or more logical operators, generating a profiling rule based on at least one selected from a group consisting of the snapshot, the reverse-index, the search query, and the search result, obtaining an IP address search result by forming the search query using the IP address, and classifying the Internet endpoint based on the IP address search result using the profiling rule.

In general, in one aspect, the present invention relates to a computer readable medium, embodying instructions executable by the computer to perform method steps for profiling an Internet endpoint associated with an Internet Protocol (IP) address, the instructions comprising functionality for generating a profiling rule using an Internet search engine, obtaining a search result by inputting the IP address to the Internet search engine, and classifying the Internet endpoint based on the search result using the profiling rule.

In general, in one aspect, in the computer readable medium, generating the profiling rule includes obtaining a seed search result by inputting a seed set to the Internet search engine, the seed set comprising a plurality of randomly chosen IP addresses, the seed search result comprising a plurality of hit texts and a Uniform Resource Locator (URL) associated with a hit text of the plurality of hit texts, the plurality of hit texts comprising a plurality of phrases, the hit text comprising a phrase of the plurality of phrases, ranking the plurality of phrases to generate a rank of the phrase based a count of the phrase in the plurality of hit texts, adding the phrase to a key phrase list if the count exceeds a pre-determined threshold, assigning a URL class to the URL if the phrase is added to the key phrase list, the URL class being determined from the phrase based on semantics, determining a IP tag associated with the URL class, the IP tag being determined from the URL class and the phrase based on semantics, and associating the phrase with the URL class in the profiling rule.

In general, in one aspect, in the computer readable medium, classifying the Internet endpoint includes obtaining a search result by inputting the IP address to the Internet search engine, the search result comprising a Uniform Resource Locator (URL) having a domain name, and assigning the URL class to the URL and assigning the IP tag to the Internet end point if the domain name comprises the phrase.

In general, in one aspect, in the computer readable medium, the profiling rule further comprises a data structure having an entry, the entry having a first domain name associated with the phrase, and classifying the Internet endpoint includes obtaining a search result by inputting the IP address to the Internet search engine, the search result comprising a Uniform Resource Locator (URL) having a second domain name, assigning the URL class to the URL and assigning the IP tag to the Internet end point if the first domain name is the same as the second domain name.

In general, in one aspect, in the computer readable medium, the data structure is a hash table having a plurality of indexes corresponding to a plurality of values, the plurality of indexes comprising the first domain name, the plurality of values comprising the phrase, the search result further comprises a hit text associated with the URL, the hit text comprising a phrase in the key phrase list, and generating the profiling rule further includes adding an index comprising the second domain name to the cache if the plurality of indexes do not comprise the second domain name, setting a counter to an initial count, obtaining another search result by inputting another IP address to the Internet search engine, the another search result comprising another hit text associated with another URL; the another hit text comprising another phrase in the key phrase list, incrementing the counter if the another URL comprises the second domain name, and setting a value in the hash table corresponding to the index based on at least one selected from the group consisting of the phrase and the another phrase if the counter exceeds a pre-determined threshold.

In general, in one aspect, in the computer readable medium, the hit text comprises content of a webpage referenced by the URL.

In general, in one aspect, the present invention relates to a computer readable medium, embodying instructions executable by the computer to perform method steps for profiling an Internet endpoint associated with an Internet Protocol (IP) address, the instructions comprising functionality for collecting a snapshot of a plurality of web-pages in at least a portion of Internet, generating a reverse-index based on the snapshot, the reverse-index being a mapping of phrases to web-pages having the phrases therein, resolving a search query using the reverse-index to generate a search result, the search query comprising at least one selected from a group consisting of a search phrase and two or more search phrases combined via one or more logical operators, generating a profiling rule based on at least one selected from a group consisting of the snapshot, the reverse-index, the search query, and the search result, obtaining an IP address search result by forming the search query using the IP address, and classifying the Internet endpoint based on the IP address search result using the profiling rule.

Other aspects and advantages of the invention will be apparent from the following description and the appended claims.

BRIEF DESCRIPTION OF DRAWINGS

FIGS. 2A-2C shows a flow chart of a method according to aspects of the invention.

DETAILED DESCRIPTION

Figure 1A:
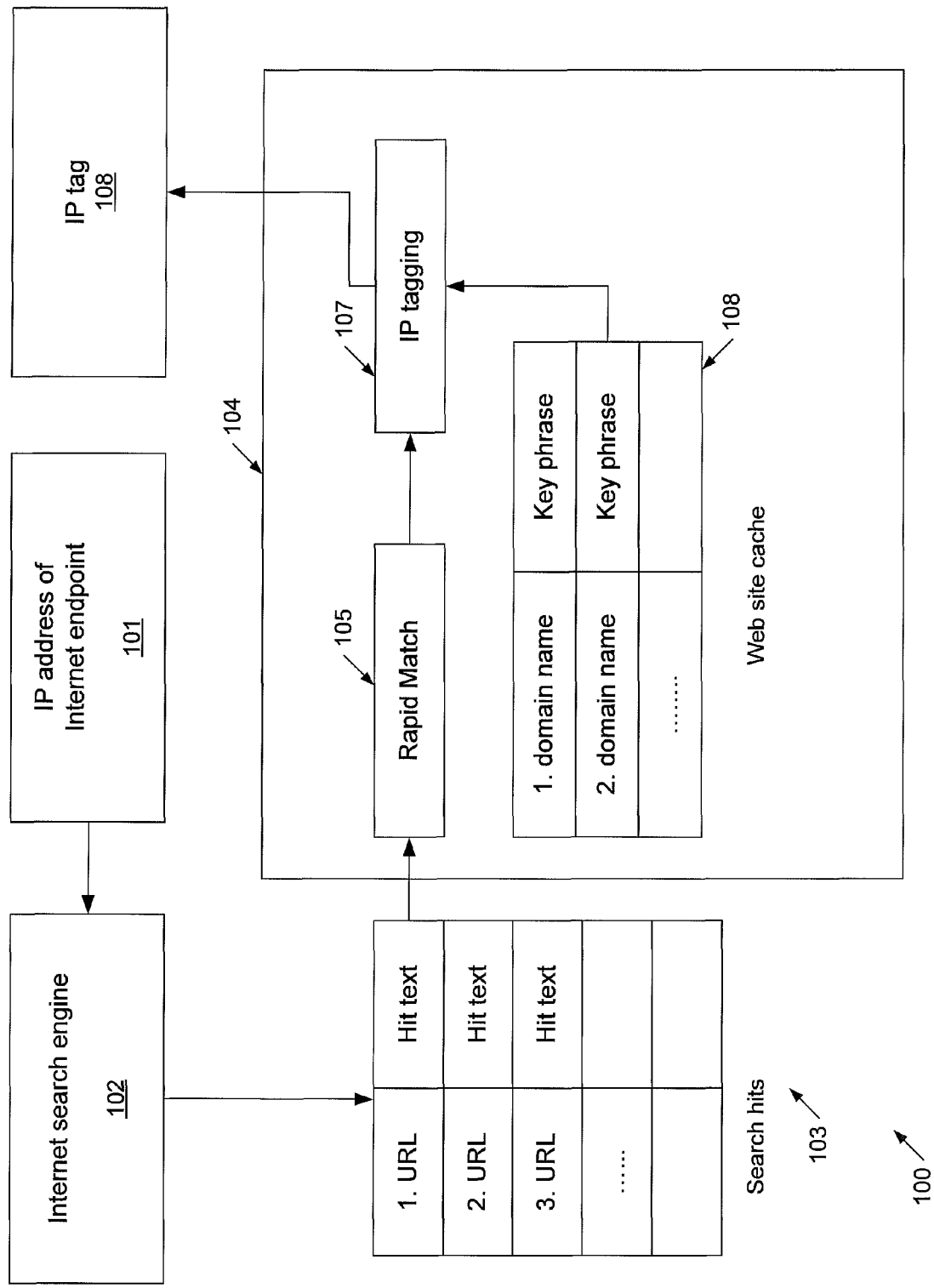
FIG. 1A shows a system block diagram for profiling an Internet endpoint associated with an IP address according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

FIG. 1A shows a system block diagram of a system (100) for profiling an Internet endpoint associated with an IP address according to aspects of the invention. Here, the system (100) includes the IP address (101) of an Internet endpoint (not shown), an Internet search engine (102), a search result (103), an Internet endpoint profiler (104), and an IP tag (108). The IP address (101) is used as a search phrase (or input) for the Internet search engine (102). An example of IP address (101) used for illustration below includes 200.101.18.182. An example of Internet search engine (102) that may be used in system (100) includes Google™ search engine, which is a product by Google Corporation. An Internet search engine typically includes the following: (1) Crawler, which collects a snapshot of all the web-pages in at least a portion of the Internet (e.g., World Wide Web), (2) Indexer, which uses the snapshot collected by the crawler to build a reverse-index, defined as a mapping of phrases or words to the web-pages they occur in, (3) Search Infrastructure, where a search query (defined as a combination of phrases or words via operators such as OR, AND, NOT, etc.) is then resolved by making use of the reverse-index. All the documents that match a query are then ranked via pre-determined criteria such as popularity of the web-page, relevance of the query with respect to the web-page in terms of where the query phrases/words appear in the document, etc. Finally, all the web-pages matching a query are returned to the user, where for each result, the user sees the URL for the web-page and the hit-text defined as a portion of the web-page text with the best match with the query.

In the system (100), the Internet search engine (102) receives the IP address (101) and generates a search result (103), which may be input into the Internet endpoint profiler (104) for generating the IP tag (108) that characterizes the Internet endpoint corresponding to the IP address (101). The Internet endpoint profiler (104) uses the search result (103) received from the Internet search engine (102) to configure a website cache (108). The Internet endpoint profiler (104) also includes a rapid match module (105) and an IP tagging module (107). As shown in FIG. 1, the IP tagging module (107) may receive an input directly from the rapid match module (105) under certain match condition based on the search result (103). Alternatively, the IP tagging module (107) may receive an input from the rapid match module (105) via the website cache (108) if the match condition is not satisfied based on the search result (103). The details of the match condition is described later with respect to FIG. 2 below.

Further as shown in FIG. 1A, the search result (103) may include one or more identifier with associated hit text. The identifier is used to identify the identity or name of a resource (e.g., a website or a document on the Internet), which is the result of the search from the search engine. The identifier is typically a Uniform Resource Locator (URL) that in most cases is a synonym with Uniform Resource Identifier (URI) as described on the Internet Engineering Task Force (IETF) RFC-3986 document. Each URL may include a domain name, which identifies a computer, computers, or other machines on the Internet. The domain name may be a hostname, a top level domain name, a second level domain name, a registered domain name provide by domain name registrars, or other forms of domain names known to one skilled in the art. Further, one machine with one IP address may provide different websites using different domain names in virtual hosting.

The hit text may include one or more phrases (e.g., a word, bi-word, or other word combination forming a phrase), from which a key phrase list may be formed based on a ranking scheme. The website cache (108) has multiple entries. Each website cache entry may include a domain name and an associated key phrase from the key phrase list. More details of generating the key phrase list and configuring the website cache are described in more detail later.

Figure 1B:
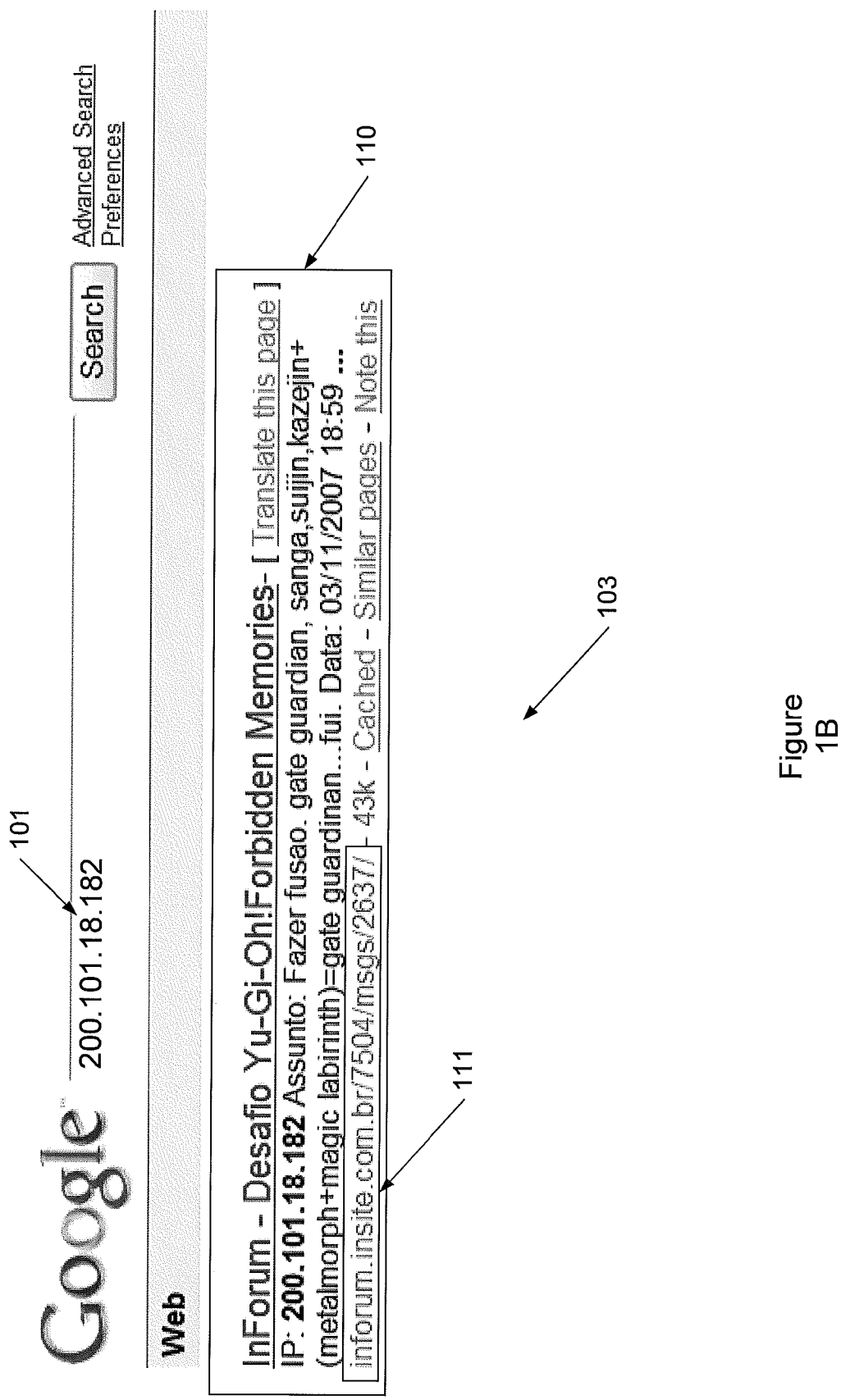
FIG. 1B depicts an exemplary search result associated with an IP address according to aspects of the invention.

FIG. 1B shows an example of the search result (103) generated by inputting the IP address (101) (e.g., 200.101.18.182) to the Internet search engine (102) (e.g., the Google™ search engine). Here, the search result (103) include the hit text (110), which includes the URL (111). In this example, the URL (111) includes a domain name "info-rum.insite.com". In one or more embodiments of the invention, the hit text (110) may be expanded to include the entire content of the website (or webpage) referenced by the URL (111).

Figure 2C:
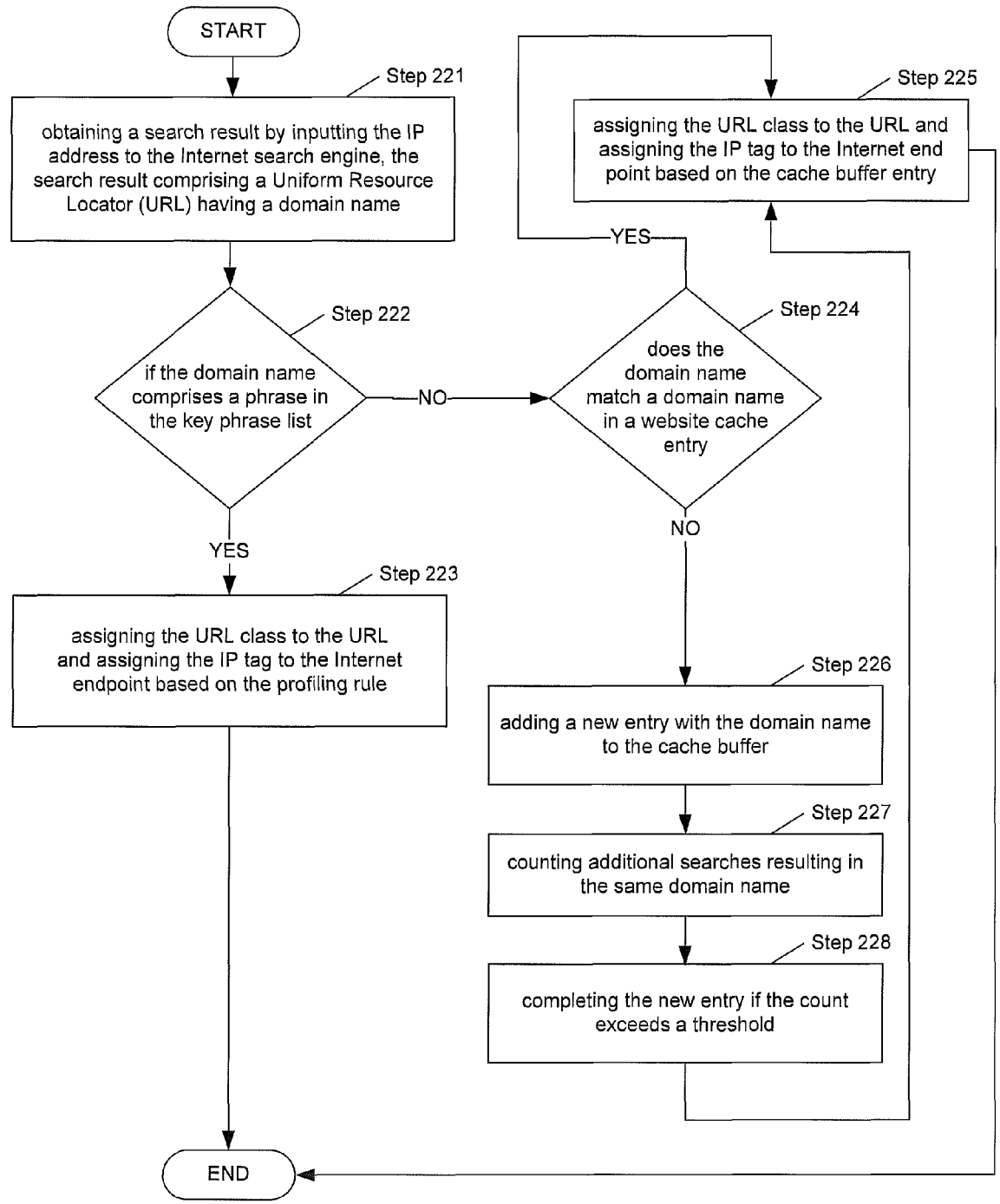

FIGS. 2A-2C shows a flow chart of a method according to aspects of the invention. The method may be practiced, for example using the system (100) described with respect to FIGS. 1A and 1B above. As shown in FIG. 2A, initially, a profiling rule is generated using an Internet search engine (e.g., the Internet search engine (102)) (Step 201). The profiling rule may be applied for profiling an Internet endpoint in a profiler (e.g., the Internet endpoint profiler (104)). Subsequently, the Internet endpoint may be profiled by inputting the associated IP address (e.g., the IP address (101)) to the Internet search engine to obtain a search result (e.g., the search result (103)) (Step 202). The interne endpoint may then be classified (e.g., by the Internet endpoint profiler (104)) using the profiling rule (Step 203).

FIG. 2B shows details of generating the profiling rule in the step (201) of FIG. 2A. Here, a seed set of randomly selected IP addresses are inputted into the Internet search engine to obtain a seed search result (Step 211). Each of the search result may include a hit text (e.g., the hit text (101)) and a URL (e.g., the URL (111)). The phrases from all the hit texts (e.g., identified by a string matching algorithm) may be ranked based on the frequency of occurrence in the seed search result (Step 212). A key phrase may be created containing the top ranked key phrases based on a pre-determined threshold (e.g., phrases exceeding 50 occurrences, the top 50 ranked phrases, etc.) (Step 213). For each phrase added to the key phrase list, a URL class is determined for classifying the corresponding URL based on semantics relating to the phrase and associated hit text (Step 214). In addition, a IP tag associated with the URL class is determined based semantics relating to the URL class and the phrase (Step 215). Accordingly, the phrase added to the key phrase list and the associated URL class and the IP tag are included in the profiling rule (Step 216).

FIG. 2C shows details of profiling the Internet endpoint using the profiling rule in steps (202) and (203) of FIG. 2A. Here, the IP address of the Internet endpoint to be profiled is inputted into the Internet search engine to obtain a URL with a domain name in the search result (Step 221). A comparison is made (e.g., by the rapid match module (105)) as to whether the domain name contains a phrase in the key phrase list (Step 222). If the domain name does contain a phrase in the key phrase list, the URL class and the IP tag associated with the phrase in the profiling rule are used to classify the URL and the Internet endpoint (Step 223).

If the domain name does not contain a phrase in the key phrase list in the comparison of step 222, the domain name is looked up, for example in a list, table, cache, or other suitable data structure (e.g., website cache (108)). If the domain name is not found in any entry of the data structure (Step 224), a new entry containing the domain name is added to the data structure (Step 226). This new entry may start out with a null value. The Internet endpoint may not be classified at this point. A counter may be initialized for racking additional IP addresses inputted into the Internet search engine and coming up with the same domain name. Once the occurrence of this domain name exceeds a pre-determined threshold, the value of this new entry is determined to complete the new entry based on all related phrases associated with this domain name from these search results (Step 228). Accordingly, the previous Internet endpoint, which produced this domain name in the search results may now be classified by the completed entry in the data structure (e.g., website cache (108)) (Step 225).

FIGS. 3A-3W depicts additional exemplary search results associated with an IP address according to aspects of the invention. In each of these exemplary search results, a URL and a key phrase are identified. In addition, URL classes and IP tags are determined based on semantics. TABLE 1 below lists exemplary key phrases (denoted as "Keywords") in an exemplary key phrase list and corresponding URL classes (denoted as "Website Class") and IP tags (denoted as "Tags") forming an exemplary profiling rule. Key phrases in a group are separated by "|" where each group is bracketed with "{ }".

Multiple groups may be combined using logical operators such as "&". Parameters within "< >" in a IP tag are specific parameters associated with the corresponding URL classes that are extracted from the hit text based on semantics. Parameters within "[ ]" in a IP tag are general relevant information extracted from the hit text based on semantics.

While the key phrases in these exemplary search results are determined based on specific method steps described with respect to FIG. 2B above. The URL classes and IP tags are determined based on semantics, i.e., study of the descriptive meaning from the hit text. Although examples of the URL classes, IP tags, and parameters within "< >" and "[ ]" are given using particular choices of descriptive wordings, it will be apparent to those skilled in the art with the benefit of this disclosure that other suitable wordings or terminologies may also be used without deviating from this invention.

FIG. 3C depicts the search result from inputting the IP address 61.145.101.74 into the Google™ search engine. Here, the key phrase "spam" is found in the URL in the hit text, therefore the URL class "spamlist" is assigned to the URL "webmail.unizar.es/spam". This IP address is therefore classified (or tagged) as a "spammer" based on semantics.

FIG. 3D depicts the search result from inputting the IP address 84.58.67.203 into the Google™ search engine. Here, the key phrase "blacklist" is found in the URL in the hit text, therefore the URL class "blacklist" is assigned to the URL "www.unsubscore.com". This IP address is therefore classified (or tagged) as "blacklisted" based on semantics.

FIG. 3E depicts the search result from inputting the IP address 207.44.248.65 into the Google™ search engine. Here, the key phrase "adserver" is found in the first URL in the hit text, therefore the URL class "Ad-server list" is

TABLE 1

| Keywords | Website Class | Tags |
|---|---|---|
| {'ftp' | 'webmail' | 'dns' | 'email' | 'proxy' | 'smtp' | 'mysql' | 'pop3' | 'mms' | 'netbios'} | Protocols and Services | <protocol name> server |
| {'trojan' | 'worm' | 'malware' | 'spyware' | 'bot'} | Malicious information list | <issue name> affected host |
| 'spam' | Spamlist | spammer |
| {'blacklist' | 'banlist' | 'ban' | 'blocklist'} | Blacklist | blacklisted |
| 'adserver' | Ad-server list | adserver |
| {'domain' | 'whois' | 'website'} | Domain database | website |
| {'dns' | 'server' | 'ns'} | DNS list | DNS server |
| {'proxy' | 'anonymous' | 'transparent'} | Proxy list | proxy server |
| 'router' | Router addresses list | router |
| 'mail server' | Mail server list | mail server |
| 'mail server' & {'spam' | 'dictionary attacker'} | Malicious mail servers list | mail server [spammer] [dictionary attacker] |
| {'counter strike' | 'warcraft' | 'age of the empires' | 'quake' | 'halo' | 'game'} | Gaming servers list | <game name> server |
| {'counter strike' | 'warcraft' | 'age of the empires |' 'quake' 'halo' | 'game'} & {'abuse' | 'block'} | Gaming abuse list | <game> node [abuser] [blocked] |
| {'torrent' | 'emule' | 'kazaa' | 'edonkey' | 'announce' | 'tracker' | 'xunlei' | 'limewire' | 'bitcomet' | 'uusee' | 'qqlive' | 'pplive'} | p2p node list | <protocol name> p2p node |
| {'irc' | 'undernet' | 'innernet' | 'dal.net'} | IRC servers list | IRC server |
| {'yahoo' | 'gtalk' | 'msn' | 'qq' | 'icq' | 'server' | 'block'} | Chat servers | <protocol name> chat server |
| {'generated by' | 'awstats' | 'wwwstat' | 'counter' | 'stats'} | Web log site | web user [operating system] [browser][date] |
| {'cachemgr' | 'ipcache'} | Proxy log | proxy user [site accessed] |
| {'forum' | 'answer'| 'resposta' | 'reponse' | 'comment' | 'comentario' | 'commentaire' | 'posted' | 'poste' | 'registered'| 'registrado' | 'enregistre' | 'created' | 'criado' 'cree' | 'bbs' | 'board' | 'club' | 'guestbook' | 'cafe'} | Forum | forum user [date][user name] [http share][ftp_share] [streaming node] |

FIG. 3A depicts the search result from inputting the IP address 198.65.144.237 into the Google™ search engine. Here, the key phrase "mms" is found in the hit text, therefore the URL class "Protocols and Services" is assigned to the URLs "percautus.com.br/radio", "welitagomes.spaces.live.com", and "www.bairroflamengo.com.br". Upon browsing at least one of the website using the URL, it is found that streaming radios is listed. This IP address is therefore classified (or tagged) as a "<mms> server" based on semantics.

FIG. 3B depicts the search result from inputting the IP address 69.66.187.2 into the Google™ search engine. Here, the key phrase "spyware" is found in the first two URLs in the hit text, therefore the URL class "Malicious information list" is assigned to the URL "spywaredetector.net". Upon browsing the website using the URL, it is found that spyware is listed. This IP address is therefore classified (or tagged) as a <spyware> affected hosts based on semantics. In addition, the key phrase "awstats" is found in the third URL in the hit text, therefore the URL class "Web log site" is assigned to the URL "donmega.com". This IP address is therefore also classified (or tagged) as "web user" based on semantics.

assigned to the URL "www.adserverstatus.com". This IP address is therefore classified (or tagged) as "ad-server" based on semantics.

FIG. 3F depicts the search result from inputting the IP address 216.127.55.45 into the Google™ search engine. Here, the key phrase "whois" is found in the first URL in the hit text, therefore the URL class "Domain database" is assigned to the URL "www.coolwhois.com". Upon browsing the website using the URL, it is found that whois is listed. This IP address is therefore classified (or tagged) as "website" based on semantics.

FIG. 3G depicts the search result from inputting the IP address 69.111.95.106 into the Google™ search engine. Here, the key phrase "DNS" is found in the first three URLs in the hit text, therefore the URL class "DNS list" is assigned to the URL "www.dnsserverlist.org", "www.walltechnet.com", and "www.whois.ws". Upon browsing the website using at least one of the URLs, it is found that DNS servers are listed. This IP address is therefore classified (or tagged) as "DNS servers" based on semantics. In addition, the key phrases "whois" and "forum" are also found in other sections in the hit text of the search results. Therefore additional URL classes and IP tags may be assigned based on those results to further profiling the IP address.

FIG. 3H depicts the search result from inputting the IP address 201.229.208.2 into the Google™ search engine. Here, the key phrase "PROXY" is found in the last two sections in the hit text, therefore the URL class "proxy list" is assigned to the URL "goodbyefirewall.cn" and "www.proxy-hut.org". This IP address is therefore classified (or tagged) as "Proxy servers" based on semantics.

FIG. 3I depicts the search result from inputting the IP address 195.242.214.33 into the Google™ search engine. Here, the key phrase "router" is found in the URL in the hit text, therefore the URL class "Router addresses list" is assigned to the URL "www.netdimes.org". This IP address is therefore classified (or tagged) as "router" based on semantics.

FIG. 3J depicts the search result from inputting the IP address 65.54.246.88 into the Google™ search engine. Here, the key phrase "Mail server" is found in the second section in the hit text, therefore the URL class "Mail server list" is assigned to the URL "www.Projecthoneypot.org". This IP address is therefore classified (or tagged) as "Mail server" based on semantics.

FIG. 3K depicts the search result from inputting the IP address 217.233.206.23 into the Google™ search engine. Here, the key phrase "dictionary attacker" is found in the URL in the hit text. In addition the key phrase "Mail server" is found in the webpage referenced by the URL, therefore the URL class "Malicious mail server list" is assigned to the URL "www.projecthoneypot.org". This IP address is therefore classified (or tagged) as "Mail server [dictionary attacker]" based on semantics.

FIG. 3L depicts the search result from inputting the IP address 200.199.201.101 into the Google™ search engine. Here, the key phrase "Counter-Strike" is found in the second section in the hit text, therefore the URL class "Gaming servers list" is assigned to the URL "forum.counter-strike-br.com.br". This IP address is therefore classified (or tagged) as "<Counter strike> server" based on semantics. In addition, the key phrase "forum" is also found in the hit text. Additional details of how "forum" key word is treated can be found with respect to FIG. 3S below.

FIG. 3M depicts the search result from inputting the IP address 200.101.75.139 into the Google™ search engine. Here, the key phrase "quakeabuse" is found in the first URL in the hit text, therefore the URL class "Gaming abuse list" is assigned to the URL "www.quakeabuse.org". This IP address is therefore classified (or tagged) as "<quake> [abuser]" based on semantics.

FIG. 3N depicts the search result from inputting the W address 220.164.140.199 into the Google™ search engine. Here, the key phrase "eMule" is found in the first section in the hit text as well as the URL in the hit text, therefore the URL class "P2P node list" is assigned to the URL "forum.emule-project.net". This IP address is therefore classified (or tagged) as "<emule> p2p node" based on semantics. In addition, the key phrase "forum" is also found in the hit text. Additional details of how "forum" key word is treated can be found with respect to FIG. 3S below.

FIG. 3O depicts the search result from inputting the IP address 158.38.8.251 into the Google™ search engine. Here, the key phrase "IRC" is found in the first section in the hit text, therefore the URL class "IRC server list" is assigned to the URL "irc.netsplit.de". This IP address is therefore classified (or tagged) as "IRC server" based on semantics. In addition, the key phrase "forum" is also found in the hit text. Additional details of how "forum" key word is treated can be found with respect to FIG. 3S below.

FIG. 3P depicts the search result from inputting the IP address 58.61.33.40 into the Google™ search engine. Here, the key phrase "qq" is found in the first three sections in the hit text, therefore the URL class "Chat servers" is assigned to the URL "www.net130.com", "bbs.router.net.cn", and "www.m0n0china.org". This IP address is therefore classified (or tagged) as "<QQ> chat server" based on semantics.

FIG. 3Q depicts the search result from inputting the IP address 200.101.79.152 into the Google™ search engine. Here, the key phrase "awstats" is found in the URL in the hit text, therefore the URL class "Web log site" is assigned to the URL "biblioteca.catie.ac.cr". This IP address is therefore classified (or tagged) as "web user" based on semantics.

FIG. 3R depicts the search result from inputting the IP address 66.11.49.136 into the Google™ search engine. Here, the key phrases "proxy", "cachemgr", and "ipcache" are found in the second, third, and fourth sections in the hit text, therefore the URL class "Proxy log" is assigned to the URL "proxy.ncu.edu.tw", "proxyftp.tyrc.edu.tw". This IP address is therefore classified (or tagged) as "proxy user" based on semantics.

FIG. 3S depicts the search result from inputting the IP address 200.143.1.34 into the Google™ search engine. Here, the key phrase "forum" (301) is found in the URL in the hit text, therefore the URL class "forum" is assigned to the URL "inforum.insite.com.br". The user name "harabari" (302) and post date "30/03/2006" (303) associated with the IP address "200.143.1.34" (304) can also be determined based on semantics. This IP address is therefore classified (or tagged) as "forum user [30/03/2006] [harabari]" based on semantics.

Figure 3T:
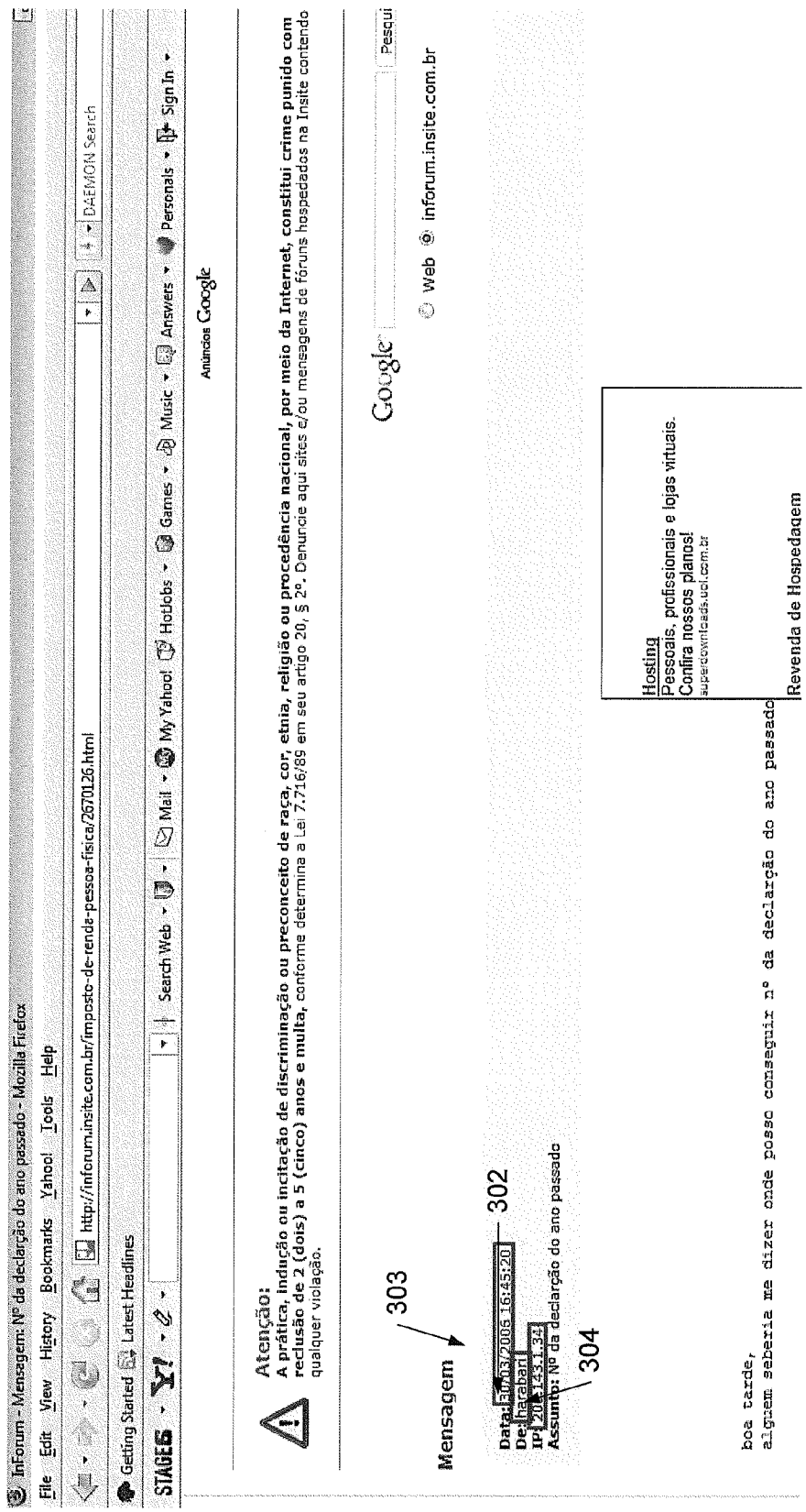
FIGS. 3A-3W depicts additional exemplary search results associated with an IP address according to aspects of the invention.

FIG. 3T depicts the web page referenced by the URL "inforum.insite.com.br", which confirms the user name (302) and post date (303) associated with the IP address "200.143.1.34" (304).

Figure 3U:
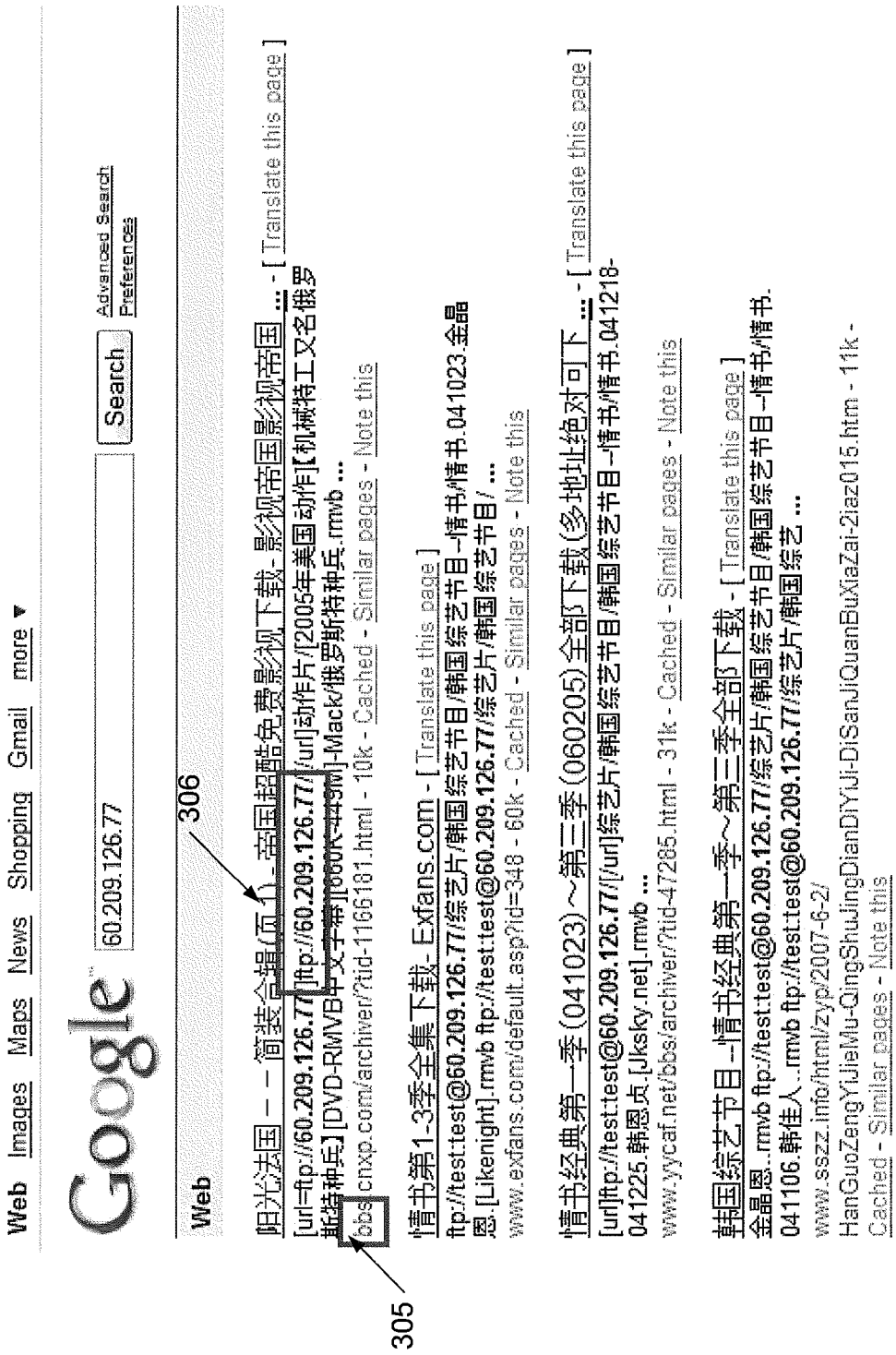
Figure 3W:
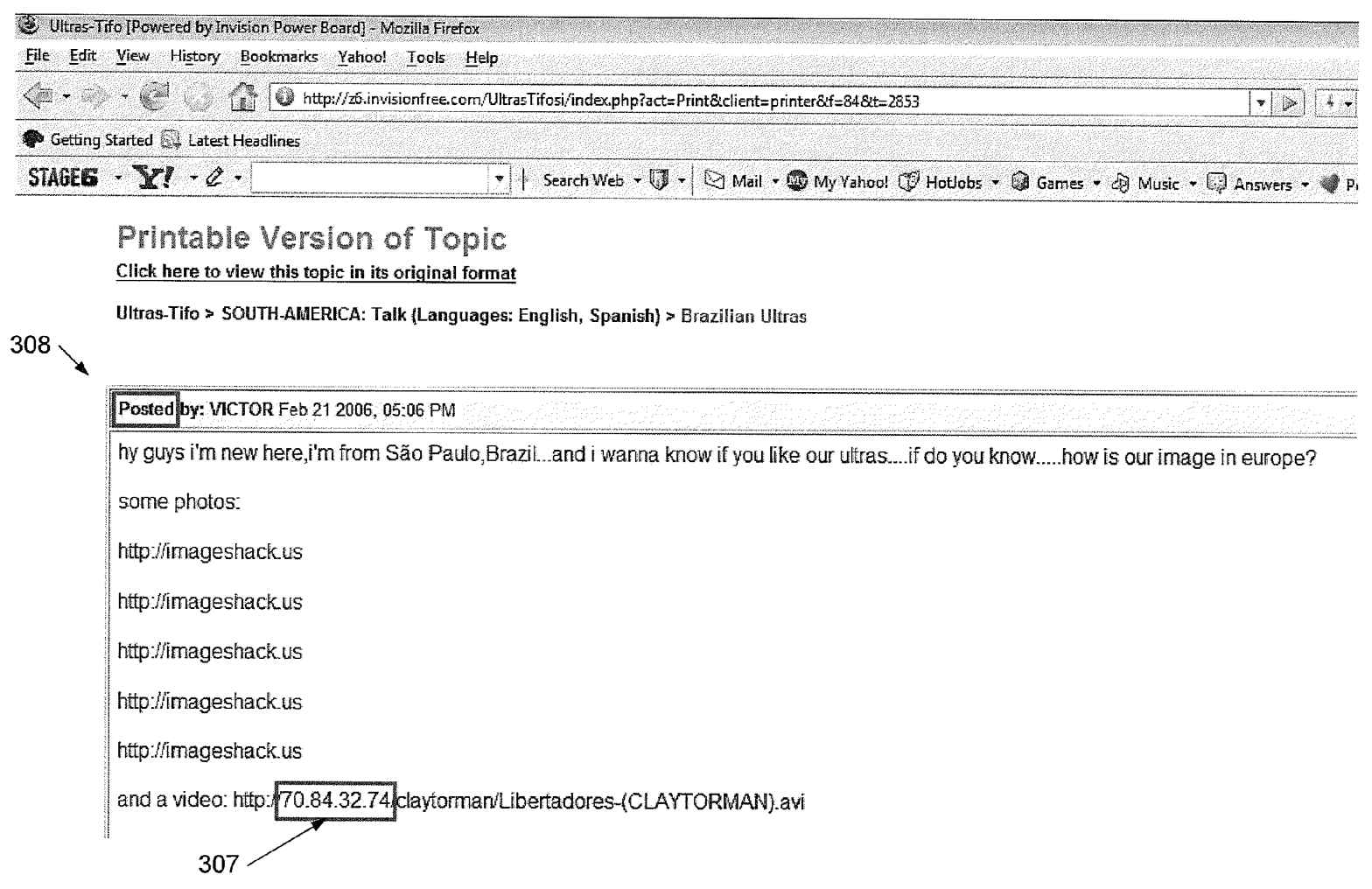

FIG. 3U depicts the search result from inputting the IP address 60.209.126.77 into the Google™ search engine. Here, the key phrase "bbs" (305) is found in the URL in the hit text, therefore the URL class "forum" is assigned to the URL "bbs.cnxp.com". A ftp address (306) can also be determined based on semantics. This IP address is therefore classified (or tagged) as "forum user [ftp_share]" based on semantics.

FIGS. 3V and 3W depict the search result from inputting the IP address 70.84.32.74 into the Google™ search engine and the web page referenced by the URL "z6.invisionfree.com" found in the hit text of the search result. Here, the key phrase "posted" (308) is found in the web page of FIG. 3W, therefore the URL class "forum" is assigned to the URL "z6.invisionfree.com". A http address (307) can also be determined based on semantics in the hit text of FIG. 3V as well as the web page of FIG. 3W. This IP address is therefore classified (or tagged) as "forum user [http_share]" based on semantics.

Exemplary Internet endpoints profiling has been conducted over a large collection of associated IP addresses. TABLE 2 shows the networks in three geographical area: Asia (China), South America (Brazil), North America (US), and Europe (France). The Asian and South American internet service provider (ISP) network studied serve the IP addresses in the /17 and /18 range, while the North American and European ISP network studied serve larger IP address range. The "/XX" notation used here represents "$2^{32-XX}$". Some of the IP ranges in TABLE 2 are anonymized for privacy reasons.

TABLE 2

| Asia | S. America | N. America | Europe |
|---|---|---|---|
| XXX.39.0.0/17 | XXX.96.128.0/17 | XXX.160.0.0/12 | 62.147.0.0/16 |
| XXX.172.0.0/18 | XXX.101.0.0/17 | XXX.160.0.0/13 | 81.56.0.0/15 |
| XXX.78.192.0/18 | XXX.103.0.0/17 | XXX.168.0.0/14 | 82.64.0.0/14 |
| XXX.83.128.0/17 | XXX.140.128.0/18 | XXX.70.0.0/16 | |
| XXX.239.128.0/18 | XXX.163.0.0/17 | XXX.0.0.0/11 | |
| XXX.69.128.0/17 | XXX.193.192.0/18 | | |
| XXX.72.0.0/17 | XXX.10.128.0/18 | | |
| | XXX.14.64.0/18 | | |
| | XXX.15.64.0/18 | | |
| | XXX.24.0.0/18 | | |
| | XXX.25.64.0/18 | | |
| | XXX.34.0.0/18 | | |

An exemplary website cache (e.g., described with respect to FIGS. 1A and 2C) is depicted in TABLE 2 below based on the profiling results corresponding to TABLE 2. Here, three website caches are separately created for the North American, Asian, and South American regions. In each region, 10 top website cache entries are listed as "Nr" 1 through 10. The domain name portion of the entries are listed under "Site" with value portion of the entries listed under "Info" using notations described in the bottom row of TABLE 3. The value portion represents the URL classes determined as described with respect to examples in FIGS. 3A-3S above.

TABLE 3

| | N. America | | | | Asia | | | | S. America | | |
|---|---|---|---|---|---|---|---|---|---|---|---|
| Nr | Site | Hits | Info | Nr | Site | Hits | Info | Nr | Site | Hits | Info |
| 1 | whois.domaintools.com | 338 | D | 1 | jw.dhu.edu.cn | 1381 | S | 1 | weblinux.ciasc.gov.br | 395 | S |
| 2 | en.wikipedia.org | 263 | F | 2 | projecthoneypot.org | 377 | M | 2 | projecthoneypot.org | 371 | M |
| 3 | robtex.com | 255 | BDN | 3 | info.edu.sh.cn | 268 | S | 3 | robtex.com | 252 | BDN |
| 4 | projecthoneypot.org | 217 | M | 4 | czstudy.gov.cn | 227 | S | 4 | redes.unb.br | 252 | S |
| 5 | extremetracking.com | 202 | S | 5 | qqdj.gov.cn | 181 | S | 5 | pt.wikipedia.org | 200 | F |
| 6 | botsvsbrowsers.com | 182 | W | 6 | zhidao.baidu.com | 176 | F | 6 | appiant.net | 136 | S |
| 7 | cuwhois.com | 151 | D | 7 | 1bl.org | 154 | B | 7 | www.tracemagic.net | 116 | S |
| 8 | proxy.ncu.edu.tw | 132 | P | 8 | cqlp.gov.cn | 149 | S | 8 | www.luziania.com.br | 91 | F |
| 9 | comp.nus.edu.sg | 116 | S | 9 | cache.vagaa.com | 142 | T | 9 | pgl.yoyo.org | 90 | A |
| 10 | quia.jp | 108 | M | 10 | bid.sei.gov.cn | 122 | S | 10 | netflow3.nhlue.edu.tw | 76 | S |
| Cache size: 827 | | | | Cache size: 892 | | | | Cache size: 728 | | | |

A: adservers, B: blacklist, D: domaindb, F: forum, M: mail/spam, N: dnsdb, P: proxy cache, S: Web logs, T: torrent, W: bot detector An exemplary key phrase list (e.g., described with respect to FIGS. 2A and 2B) is depicted in TABLE 4 below based on the profiling results corresponding to TABLE 2. The leftmost column of TABLE 4 lists exemplary URL classes. Key phrases associated with the URL classes are listed in separate columns in each of the five geographical areas. Each key phrase is also tagged with exemplary number of occurrences in creating the key phrase list.

TABLE 4

| | Asia (China) | S. America (Brazil) | N. America (U.S.) | Europe (France) |
|---|---|---|---|---|
| Operating systems | windows(2,445) ubuntu(209) redhat(189) linux(137) unix(92) longhorn(23) slackware(20) deblan(17) suse(13) gentoo(10) fedora(10) opensuse(4) | windows(1,783) deblan-br(1,700) ubuntu(721) linux(151) redhat(91) fedora(39) unix(13) opensuse(11) mandrivalinux(10) suse(10) gentoo(7) mandrake(5) slackware(5) | windows(659) redhat(310) linux(144) opensuse(100) ubuntu(72) deblan(34) suse(20) unix(13) fedora(12) gentoo(10) slackware(2) mandrake(2) | deblan(1,206) windows(805) ubuntu(570) linux(556) redhat(263) opensuse(105) mandrivalinux(78) unix(76) mandrake(60) suse(50) fedora-fr(26) gentoo(19) knoppix-fr(10) slackware(1) |
| Browsers | MSIE(2,694) mozilla(417) opera(48) netscape(29) maxthon(14) | mozilla(1,354) MSIE(1,061) opera(54) netscape(49) enigma(17) maxthon(3) | MSIE(495) mozilla(451) netscape(72) opera(20) | mozilla(515) MSIE(320) netscape(75) opera(29) enigma(8) maxthon(1) |
| Malicious activity | spam(2,392) net-abuse(2,087) malware(883) dnsbl(253) googlebot(100) blacklist(92) worm(30) virus(29) trojan(21) spyware(17) hijack(5) quakeabuse(4) stormworm(4) banlist(4) | spam(5,532) net-abuse(1,514) blacklist(1,152) blocklist(443) virus(272) dnsbl(239) malware(210) bots(90) googlebot(48) trojan(35) quakeabuse(34) banlist(28) spyware(12) worm(10) hijack(8) stormworm(10) | spam(2,240) bots(259) blacklist(129) googlebot(113) malware(112) dnsbl(89) net-abuse(85) spyware(54) virus(52) hijack(32) adservers(24) worm(20) stormworm(12) trojan(7) banlist(5) quakeabuse(4) | spam(7,672) net-abuse(314) quakeabuse(182) malware(120) banlist(116) blacklist(98) googlebot(98) dnsbl(50) virus(50) bots(35) adservers(16) spyware(15) stormworm(9) trojan(7) hijack(5) worm(5) |
| P2P | ppstream(12,818) torrent(4,441) Foxy(2,612), gnutella(884) announce(547) tracker(388) p2psky(160) bitcomet(39) edonkey2000(24) eMule(18) ed2k(16) xunlei(14) LimeWire(7) tvants(5) morph500(3) gnucdna(3) Ares(3) Ppiive(2) | gnutella(1,560) gnucdna(923) morph500(850) LimeWire(636) torrent(476) tracker(96) ppstream(50) announce(49) Ares(47) emule(16) p2psky(8) ed2k(4) Foxy(3) bitcomet(3) | LimeWire(311) gnutella(274) gnucdna(234) morph500(227) torrent(104) tracker(53) announce(19) Ares(8) p2psky(4) WinMX(2) emule(1) ed2k(1) | torrent(2,125) emule(689) gnutella(317) announce(283) gnucDNA(231) tracker(224) morph500(223) ppstream(153) LimeWire(116) p2psky(68) Foxy(59) ed2k(33) bitcomet(19) edonkey2000(11) Ares(4) |

TABLE 4-continued

| | Asia (China) | S. America (Brazil) | N. America (U.S.) | Europe (France) |
|---|---|---|---|---|
| Protocols & services | ftp(10,725) webmail(937) dns(692) email(462) proxy(347) mms(156) smtp(72) mysql(6) pop3(2) netbios(1) | ftp(3,383) webmail(2,633) proxy(1,023) dns(542) email(527) smtp(145) mysql(79) pop3(13) mms(9) netbios(2) | ftp(1,863) dns(386) webmail(326) proxy(302) email(144) smtp(81) mms(23) pop3(13) netbios(2) mysql(1) | ftp(12,417) webmail(7,044) proxy(442) smtp(161) dns(149) email(131) mysql(66) mms(33) netbios(20) pop3(13) |
| Instant messaging | qq(938) yahoo(700) msn(106) usenet(68) oicq(67) irc(31) icq(25) skype(4) | msn(1,233) yahoo(989) usenet(240) icq(170) qq(126) aol(111) irc(93) skype(1) | yahoo(240) aol(115) msn(61) usenet(32) irc(30) icq(8) messenger(8) skype(6) | yahoo(383) usenet(314) irc(185) aol(89) msn(70) qq(19) galm(18) icq(18) skype(12) |
| Gaming | counter-strike(37) quake(36) mmorpg(30) starcraft(21) poker(14) warcraft(6) sims(4) | sims(261) poker(145) counter-strike(144) mmorpg(30) warcraft(19) quake(9) world_of_warcraft(8) halo(4) starcraft(2) | worldofwarcraft(32) poker(14) halo(5) quake(4) sims(2) cstrike(1) | counter-strike(49) quake(43) poker(26) sims(23) warcraft(7) mmorpg(7) world_of_warcraft(5) halo(5) starcraft(2) |
| Browsing | google(47,584) bbs(32,134) blog(4,282) baldu(3,009) board(2,298) yahoo(700) youtube(356) forums(278) wikipedia(170) rapidshare(6) httpshare(4) | google(61,495) wikipedia(8,245) board(3,239) bbs(1,787) forum(1,436) blog(996) yahoo(989) orkut(564) youtube(370) baldu(76) brturbo(71) rapidshare(20) httpshare(8) | google(2,874) wikipedia(1,819) forums(1,139) bba(522) board(298) blog(287) yahoo(240) youtube(44) rapidshare(1) | google(20,454) wikipedia(6,637) forum(6,609) blog(728) bbs(709) board(533) yahoo(383) youtube(124) baldu(57) skyrock(12) rapidshare(4) |

Although the method of Internet endpoint profiling described above does not require network traffic traces, available network traces allow other classification methods requiring network traces to be compared to the method of the present invention. A graphlet based approach for classifying network traffic known as "BLINC" to those skilled in the art is described in T. Karagiannis et al., "Multilevel Traffic Classification in the Dark," ACM SIGCOMM, 2005. TABLE 5 shows exemplary comparison for the South American region comparing profiling results using the method of the present invention against that of BLINC based on available network traces. In TABLE 5, URL classes are listed in the leftmost column using notations described in the bottom row of TABLE 5. Profiling results based on the entire network trace is listed under the heading "Pkt.trace". Profiling results based on the one percent sampled entire network trace is listed under the heading "1:100 Sampled trace". In each case, total number of endpoints classified in each URL classes is listed under the heading "Tot." and is further broken down into three categories listed under the headings "B∩U", "B-U", and "U-B". The notation "B∩U" represents endpoints classified by both BLINC and the method of the present invention. The notation "B-U" represents endpoints classified by BLIC but not by the method of the present invention. The notation "U-B" represents endpoints classified by the method of the present invention but not by BLNC.

TABLE 5

| | Pkt. trace | | | 1:100 Sampled trace | | | |
|---|---|---|---|---|---|---|---|
| Cls. | Tot. | B∩U % | B-U % | U-B % | Tot. | B∩U % | B-U % | U-B % |
| C | 1769 | 16 | 7 | 77 | 484 | 8 | 1 | 91 |
| Br | 9950 | 31 | 10 | 59 | 4964 | .4 | 0 | 99.6 |
| P | 8842 | 14 | 8 | 78 | 1346 | .8 | .2 | 99 |
| G | 22 | 95 | 0 | 5 | 22 | 0 | 0 | 100 |
| S | 160 | 0 | 0 | 100 | 81 | 0 | 0 | 100 |
| M | 3086 | 0 | 0 | 100 | 1179 | 0 | 0 | 100 |
| F | 197 | 0 | 0 | 100 | 52 | 0 | 0 | 100 |

Br browsing, C chat, M mail, P p2p, S streaming, G gaming, F ftp
B BLINC, U Unconstrained Endpoint Profiling

TABLE 6

| Server tag | Traffic class, User behavior |
|---|---|
| website | Browsing |
| mail server | Mail |
| <game name> server | Gaming |
| <protocol name> chat server | Chat |
| IRC server | Chat |
| [streaming node] | Streaming |
| <issue name> affected host | Malware |
| p2p node | P2P |
| ftp server | Ftp |

Furthermore, although the method of Internet endpoint profiling described above does not require network traffic traces, the method can be applied to classify network traffic traces for a pre-determined region, for example Asia, South America, etc. First, top-ranked IP addresses determined based on a pre-determined criteria (e.g., top 5% of IP address ranked by traffic flow distribution of the Internet such as associated traffic flows of the South American region) are tagged using the method described above to generate a collection of IP tags. Based on a study using available network traffic traces in South American region, it is discovered that the majority of all IP network traffic relates to top 5% of IP addresses. Next, a set of IP tags is selected or otherwise identified from the collection of IP tags based on semantics. For example a set of server tags can be identified by considering IP tags from the collection relating to server activities. Exemplary server tags are shown in column two in TABLE 6. This concentrated distribution in the empirical statistics is then used to effectively classifying traffic flows based on this relatively small number of server tags. For example, two endpoints (i.e., source endpoint and destination endpoint) for each traffic flow trace to be classified are tagged and compared with the server tags. The traffic flow trace can be classified if either of the two endpoints, when tagged, matches any of the server tags. Due to the concentrated distribution of the empirical statistics, in majority of cases the traffic flow trace can be classified based on semantics according to a server tag matching the tag of either of the two endpoints.

TABLE 6 shows exemplary server tags and corresponding traffic classifications. For example, if an endpoint of the traffic flow trace is identified as being tagged with "website", the traffic flow trace is classified as "Browsing".

It will be understood from the foregoing description that various modifications and changes may be made in the preferred and alternative embodiments of the present invention without departing from its true spirit. For example, although the examples given above relates to a TCP/IP or an OSI network data model and Google™ search engine, the invention may be applied to other network data model and/or Internet search engines known to one skilled in the art. Furthermore, the scope of the hit text may be supplemented by variations of the examples described or include subset or superset of the examples given above, the method may be performed in a different sequence, the components provided may be integrated or separate, the devices included herein may be manually and/or automatically activated to perform the desired operation. The activation (e.g., applying the seed set, generating the profiling rule, inputting the IP address of the endpoint, classifying the endpoint, etc.) may be performed as desired and/or based on data generated, conditions detected and/or analysis of results from the network traffic.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of profiling an Internet endpoint associated with an Internet Protocol (IP) address, comprising:
    generating a profiling rule using an Internet search engine;
    obtaining a search result by inputting the IP address as a search phrase to the Internet search engine; and
    classifying the Internet endpoint based on the search result using the profiling rule,
    wherein the profiling rule comprises a IP tag and a key phrase list having a phrase associated with a URL class, the URL class being associated with the IP tag,
    wherein the profiling rule further comprises a data structure having an entry, the entry having a first domain name associated with the phrase,
    wherein the data structure is a hash table having a plurality of indexes corresponding to a plurality of values, the plurality of indexes comprising the first domain name, the plurality of values comprising the phrase,
    wherein the search result comprises:
        a Uniform Resource Locator (URL) having a second domain name; and
        a hit text associated with the URL, the hit text comprising a phrase in the key phrase list,
    wherein classifying the Internet endpoint comprises assigning the URL class to the URL and assigning the IP tag to the Internet end point if the first domain name is the same as the second domain name,
    wherein generating the profiling rule comprises:
        adding an index comprising the second domain name to the hash table if the plurality of indexes do not comprise the second domain name;
        setting a counter to an initial count;
        obtaining another search result by inputting another IP address to the Internet search engine, the another search result comprising another hit text associated with another URL; the another hit text comprising another phrase in the key phrase list;
        incrementing the counter if the another URL comprises the second domain name; and
        setting a value in the hash table corresponding to the index based on at least one selected from the group consisting of the phrase and the another phrase if the counter exceeds a pre-determined threshold.

2. A computer readable medium, embodying instructions executable by the computer to perform method steps for profiling an Internet endpoint associated with an Internet Protocol (IP) address, the instructions comprising functionality for:
    generating a profiling rule using an Internet search engine;
    obtaining a search result by inputting the IP address as a search phrase to the Internet search engine; and
    classifying the Internet endpoint based on the search result using the profiling rule,
    wherein the profiling rule comprises a IP tag and a key phrase list having a phrase associated with a URL class, the URL class being associated with the IP tag,
    wherein the profiling rule further comprises a data structure having an entry, the entry having a first domain name associated with the phrase,
    wherein the data structure is a hash table having a plurality of indexes corresponding to a plurality of values, the plurality of indexes comprising the first domain name, the plurality of values comprising the phrase,
    wherein the search result comprises:
        a Uniform Resource Locator (URL) having a second domain name; and
        a hit text associated with the URL, the hit text comprising a phrase in the key phrase list,
    wherein classifying the Internet endpoint comprises assign the URL class to the URL and assigning the IP tag to the Internet end point if the first domain name is the same as the second domain name,
    wherein generating the profiling rule comprises:
        adding an index comprising the second domain name to the hash table if the plurality of indexes do not comprise the second domain name;
        setting a counter to an initial count;
        obtaining another search result by inputting another IP address to the Internet search engine, the another search result comprising another hit text associated with another URL; the another hit text comprising another phrase in the key phrase list;
        incrementing the counter if the another URL comprises the second domain name; and
        setting a value in the hash table corresponding to the index based on at least one selected from the group consisting of the phrase and the another phrase if the counter exceeds a pre-determined threshold.

3. The method of claim 1, wherein generating the profiling rule further comprises:
    obtaining a seed search result by inputting a seed set to the Internet search engine, the seed set comprising a plurality of randomly chosen IP addresses, the seed search result comprising a plurality of hit texts and another Uniform Resource Locator (URL) associated with another hit text of the plurality of hit texts, the plurality of hit texts comprising a plurality of phrases, the another hit text comprising another phrase of the plurality of phrases;
    ranking the plurality of phrases to generate a rank of the another phrase based a count of the another phrase in the plurality of hit texts;

adding the another phrase to the key phrase list if the count exceeds another pre-determined threshold;

assigning another URL class to the another URL if the another phrase is added to the key phrase list, the another URL class being determined from the another phrase based on semantics;

determining another IP tag associated with the another URL class, the another IP tag being determined from the another URL class and the another phrase based on semantics; and associating the another phrase with the another URL class in the profiling rule.

4. The method of claim 1, wherein the Internet search engine comprises functionality for:

collecting a snapshot of a plurality of web-pages in at least a portion of Internet;

generating a reverse-index based on the snapshot, the reverse-index being a mapping of phrases to web-pages having the phrases therein; and resolving a search query using the reverse-index to generate the search result, the search query comprising at least one selected from a group consisting of the search phrase and two or more search phrases combined via one or more logical operators.

5. The method of claim 1, wherein classifying the Internet endpoint further comprises:

assigning the URL class to the URL and assigning the IP tag to the Internet end point if the second domain name comprises the phrase.

6. The method of claim 1, further comprising:

identifying a plurality of top ranked endpoints from at least a portion of the Internet based on traffic flow distribution associated with at least the portion of the Internet;

classifying the plurality of top ranked endpoints using the profiling rule to generate a plurality of IP tags;

identifying a plurality of server tags from the plurality of IP tags based on semantics;

classifying a traffic flow having a source IP address and a destination IP address according to the plurality of server tags based on semantics, wherein an IP tag of at least one selected from a group consisting of the source IP address and the destination IP address matches at least one of the plurality of IP tags.

7. The computer readable medium of claim 2, the instructions further comprising functionality for:

obtaining a seed search result by inputting a seed set to the Internet search engine, the seed set comprising a plurality of randomly chosen IP addresses, the seed search result comprising a plurality of hit texts and another Uniform Resource Locator (URL) associated with another hit text of the plurality of hit texts, the plurality of hit texts comprising a plurality of phrases, the another hit text comprising another phrase of the plurality of phrases;

ranking the plurality of phrases to generate a rank of the another phrase based a count of the another phrase in the plurality of hit texts;

adding the another phrase to the key phrase list if the count exceeds another pre-determined threshold;

assigning another URL class to the another URL if the another phrase is added to the key phrase list, the another URL class being determined from the another phrase based on semantics;

determining another IP tag associated with the another URL class, the another IP tag being determined from the another URL class and the another phrase based on semantics; and associating the another phrase with the another URL class in the profiling rule.

8. The computer readable medium of claim 2, wherein the Internet search engine comprises functionality for:

collecting a snapshot of a plurality of web-pages in at least a portion of Internet;

generating a reverse-index based on the snapshot, the reverse-index being a mapping of phrases to web-pages having the phrases therein; and resolving a search query using the reverse-index to generate the search result, the search query comprising at least one selected from a group consisting of the search phrase and two or more search phrases combined via one or more logical operators.

9. The computer readable medium of claim 2, the instructions further comprising functionality for:

assigning the URL class to the URL and assigning the IP tag to the Internet end point if the second domain name comprises the phrase.

10. The method of claim 3, wherein the hit text comprises content of a webpage referenced by the URL.

11. The computer readable medium of claim 7, wherein the hit text comprises content of a webpage referenced by the URL.

* * * * *